United States Patent
Hino et al.

(10) Patent No.: US 10,230,487 B2
(45) Date of Patent: Mar. 12, 2019

(54) OPTICAL TRANSMITTER, OPTICAL COMMUNICATION DEVICE, OPTICAL COMMUNICATION SYSTEM, AND OPTICAL TRANSMISSION METHOD

(71) Applicant: NEC CORPORATION, Minato-ku, Tokyo (JP)

(72) Inventors: Tomoyuki Hino, Tokyo (JP); Shinsuke Fujisawa, Tokyo (JP); Hitoshi Takeshita, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/125,259

(22) PCT Filed: Mar. 11, 2015

(86) PCT No.: PCT/JP2015/001318
§ 371 (c)(1),
(2) Date: Sep. 12, 2016

(87) PCT Pub. No.: WO2015/141188
PCT Pub. Date: Sep. 24, 2015

(65) Prior Publication Data
US 2017/0078044 A1    Mar. 16, 2017

(30) Foreign Application Priority Data

Mar. 19, 2014 (JP) .................................. 2014-056845
Nov. 26, 2014 (JP) .................................. 2014-239102

(51) Int. Cl.
*H04B 10/516* (2013.01)
*H04J 14/02* (2006.01)
(Continued)

(52) U.S. Cl.
CPC .......... *H04J 14/0298* (2013.01); *H04B 10/27* (2013.01); *H04B 10/506* (2013.01);
(Continued)

(58) Field of Classification Search
CPC .... H04B 10/27; H04B 10/516; H04B 10/506; H04B 10/548; H04B 10/50;
(Continued)

(56) References Cited

U.S. PATENT DOCUMENTS 5,663,822 A * 9/1997 Fee ......................... H04J 14/02
                                                            398/95
7,796,326 B1 * 9/2010 Shay .................. H04B 10/1121
                                                           359/349

(Continued)

FOREIGN PATENT DOCUMENTS

JP    2012-191452 A    10/2012
WO   2013/012015 A1    1/2013

OTHER PUBLICATIONS

Huang et al, Terabit per s Optical Superchannel with Flexible Modulation Format for Dynamic Distance Route Transmission, 2012, IEEE, pages All Document.*

(Continued)

*Primary Examiner* — Kenneth N Vanderpuye
*Assistant Examiner* — Dibson J Sanchez

(57) ABSTRACT

It is made possible to accommodate a plurality of services and transmit each of the accommodated services to a corresponding transmission device. An optical transmitter according to an exemplary aspect of the present invention includes sub-carrier adjusting means for outputting sub-carriers to a plurality of output ports according to a control signal; encoding processing means for mapping client data on a plurality of output lanes according to the control signal; a plurality of modulation means for modulating the sub- (Continued)

carriers inputted through the output ports by client data inputted through the output lanes and outputting modulated signals; and control means for generating and outputting the control signal based on transmission information.

17 Claims, 15 Drawing Sheets

(51) Int. Cl.
*H04B 10/27* (2013.01)
*H04B 10/50* (2013.01)
*H04B 10/548* (2013.01)
*H04Q 11/00* (2006.01)

(52) U.S. Cl.
CPC ......... *H04B 10/516* (2013.01); *H04B 10/548* (2013.01); *H04J 14/0227* (2013.01); *H04Q 11/0005* (2013.01); *H04Q 2011/0032* (2013.01); *H04Q 2011/0047* (2013.01)

(58) Field of Classification Search
CPC .... H04J 14/0227; H04J 14/0298; H04J 14/02; H04Q 11/0005; H04Q 2011/0032; H04Q 2011/0047; H04Q 11/00
USPC .................................................. 398/182–201
See application file for complete search history.

(56) References Cited

U.S. PATENT DOCUMENTS

| | | | | |
|---|---|---|---|---|
| 8,200,047 B1* | 6/2012 | Kowalczyk | ........ | G02B 6/12004 385/1 |
| 8,818,207 B2 | 8/2014 | Tanaka et al. | | |
| 8,995,843 B2* | 3/2015 | Chung | ................. | H04J 14/026 398/183 |
| 9,571,313 B2* | 2/2017 | Ben-Ezra | ........... | H04L 27/2628 |
| 9,668,036 B2* | 5/2017 | Wellbrock | ......... | H04Q 11/0005 |
| 2002/0191904 A1* | 12/2002 | Kani | .................... | H04B 10/506 385/24 |
| 2004/0208644 A1* | 10/2004 | Sirat | .................. | H04B 10/2575 398/186 |
| 2007/0166048 A1* | 7/2007 | Doerr | ..................... | H04B 10/60 398/158 |
| 2008/0063396 A1* | 3/2008 | Yu | ........................ | H04B 10/505 398/42 |
| 2009/0067843 A1* | 3/2009 | Way | .................... | H04B 10/506 398/79 |
| 2009/0087186 A1* | 4/2009 | Holman | ............... | H04B 10/508 398/102 |
| 2010/0008671 A1* | 1/2010 | Pratt | .................... | H04B 10/506 398/83 |
| 2010/0104289 A1* | 4/2010 | Ogura | ................. | H04B 10/505 398/82 |
| 2010/0135346 A1* | 6/2010 | Peters | .................... | H01S 5/4062 372/29.011 |
| 2010/0178057 A1* | 7/2010 | Shieh | ................. | H04L 25/0224 398/79 |
| 2010/0183309 A1* | 7/2010 | Etemad | ............... | H04B 10/505 398/79 |
| 2011/0020003 A1* | 1/2011 | Yu | ........................ | H04B 10/548 398/79 |
| 2011/0069975 A1* | 3/2011 | Liu | ........................ | H04B 10/61 398/202 |
| 2011/0182584 A1* | 7/2011 | Gottwald | ............. | H04B 10/516 398/79 |
| 2011/0206376 A1* | 8/2011 | Gottwald | ............ | H04J 14/0282 398/76 |
| 2011/0293266 A1* | 12/2011 | Aoki | .................... | H04B 10/516 398/25 |
| 2012/0230694 A1 | 9/2012 | Tanaka et al. | | |
| 2012/0321306 A1* | 12/2012 | Wellbrock | ............ | H04J 14/021 398/48 |
| 2013/0004163 A1* | 1/2013 | Aoki | .................... | H04B 10/506 398/34 |
| 2013/0058648 A1* | 3/2013 | Ji | ......................... | H04J 14/0221 398/38 |
| 2013/0089333 A1* | 4/2013 | Shen | .................... | H04B 10/506 398/79 |
| 2013/0121706 A1* | 5/2013 | Yang | .................... | H04B 10/506 398/187 |
| 2013/0202303 A1* | 8/2013 | Wilkinson | ........... | H04B 10/548 398/76 |
| 2013/0251302 A1* | 9/2013 | Bernasconi | ........... | G02F 1/0115 385/3 |
| 2014/0178071 A1* | 6/2014 | Zhang | ................. | H04B 10/5561 398/65 |
| 2014/0205286 A1* | 7/2014 | Ji | ........................... | H04B 10/40 398/45 |
| 2014/0205297 A1* | 7/2014 | Cao | ...................... | H04J 14/0257 398/79 |
| 2014/0314411 A1* | 10/2014 | Huang | ................. | H04J 14/0298 398/65 |
| 2014/0363164 A1* | 12/2014 | Kim | ........................ | H04J 14/06 398/65 |
| 2015/0023667 A1* | 1/2015 | Yu | ........................ | H04B 10/548 398/79 |
| 2015/0086207 A1* | 3/2015 | Chen | .................. | H04Q 11/0005 398/87 |
| 2015/0086217 A1* | 3/2015 | Galvanauskas | ..... | H01S 3/06754 398/188 |
| 2015/0125152 A1* | 5/2015 | Ji | ........................ | H04B 10/5561 398/76 |
| 2016/0211920 A1* | 7/2016 | Aono | .................. | H04J 14/0238 |
| 2017/0019178 A1* | 1/2017 | Alic | .................. | H04B 10/2543 |
| 2018/0062750 A1* | 3/2018 | Grubb | .................. | H04B 10/506 |
| 2018/0219645 A1* | 8/2018 | Giraldo | ............... | H04J 14/0227 |

OTHER PUBLICATIONS

Jinno et al, Distance Adaptive Spectrum Resource Allocation in Spectrum Sliced Elastic Optical Path Network, 2010, IEEE, pages All Document.*

Garrich et al, Flexibility of Programmable Add Drop Architecture for ROADMs, Mar. 9-13, 2014, Optical Fiber Communication Conference , pages All Document.*

Masahiko Jinno, et al., "Spectrum-efficient and scalable elastic optical path network: architecture, benefits, and enabling technologies", IEEE Communications Magazine, Nov. 2009, vol. 47, Issue. 11, pp. 66-73.

Hidehiko Takara et al., "Optical Path Aggregation for 1-Tb/s Transmission in Spectrum-Sliced Elastic Optical Path Network", IEEE Photonics Technology Letters, Sep. 1, 2010, vol. 22, Issue. 17, pp. 1315-1317.

Masahiko Jinno, et al., "Why do we need elastic optical path networking in the 1 Tb/s era?", Quantum Electronics Conference & Lasers and Electro-Optics (CLEO/IQEC/Pacific Rim), Aug. 28, 2011, pp. 466-468.

International Search Report for PCT Application No. PCT/JP2015/001318 , dated Apr. 14, 2015.

English translation of Written opinion for PCT Application No. PCT/JP2015/001318.

* cited by examiner

OPTICAL TRANSMITTER 1

OPTICAL TRANSMITTER, OPTICAL COMMUNICATION DEVICE, OPTICAL COMMUNICATION SYSTEM, AND OPTICAL TRANSMISSION METHOD

This application is a National Stage Entry of PCT/JP2015/001318 filed on Mar. 11, 2015, which claims priority from Japanese Patent Application 2014-056845 filed on Mar. 19, 2014, and Japanese Patent Application 2014-239102 filed on Nov. 26, 2014, the contents of all of which are incorporated herein by reference, in their entirety.

TECHNICAL FIELD

The present invention relates to an optical transmitter and an optical transmission method for transmitting a plurality of information data in an optical network, and an optical communication device and an optical communication system including the optical transmitter.

BACKGROUND ART

Video content services represented by a video streaming service are rapidly increasing, and the data of those services, which require a larger transmission capacity than the data of still image services, have made up a large fraction of the Internet traffic. This makes the transmission capacity within a network increase rapidly, and a technology to maximize the usage efficiency of existing facilities has been strongly required in parallel with adding more transmission paths or transmission devices.

The elastic optical network has been researched that is one of the technologies to maximize the usage efficiency of existing facilities and remarkably improves the frequency usage efficiency within an optical fiber. The elastic optical network is an optical network in which communication is performed selecting an optimum modulation method depending on a transmission distance or a demanded throughput. Selecting an optimum modulation method makes it possible to transmit large-volume data with a minimum frequency band.

In the elastic optical network by which large-volume data can be transmitted with high efficiency as described above, an optical transmitter is used that can select an optimum modulation method depending on a transmission distance or a demanded throughput. Because the optical transmitter used in the elastic optical network adaptively changes the modulation method depending on a transmission distance, it is necessary to make an optical transmitter with maximum performance in variable range; accordingly, it is often the case that the optical transmitter becomes overengineered compared with actual use conditions. Since a conventional optical transmitter uses a single carrier frequency, the performance of the elastic optical network that the bandwidth is variable cannot be utilized sufficiently if there is no solid blocks of band on a frequency axis. For example, Patent Literature 1 discloses an optical transmitter that can utilize the performance of the elastic optical network sufficiently, and Patent Literature 2 discloses an optical node device including a plurality of optical transmitters.

The optical transmitter disclosed in Patent Literature 1 includes a frequency interval setting unit that is disposed between a multi-frequency phase-synchronized light source and an optical modulator and individually adjusts a frequency interval of the multi-frequency phase-synchronized light source for each frequency. Adjusting the frequency interval individually for each frequency makes it possible to apply an optimum modulation rate easily; accordingly, it is possible to utilize sufficiently the performance of an optical transmitter/receiver used in the elastic optical network.

The multi-flow optical node disclosed in Patent Literature 2 includes a plurality of carrier generators or sub-carrier generators and improves the usage efficiency of the optical transmitter by allocating the carriers or the sub-carriers to modulators efficiently through optical multiplexing/demultiplexing means. This enables the identical optical transmitter to accommodate demanded services from a plurality of clients and to transmit the services to a plurality of different routes, so as not to waste a plurality of modulators in the optical transmitter.

CITATION LIST

Patent Literature

[PTL 1] Japanese Unexamined Patent Application Publication No. 2012-191452
[PTL 2] International Publication No. WO 2013/012015

SUMMARY OF INVENTION

Technical Problem

It is desirable in the elastic optical network to transmit and receive a plurality of demanded services between a plurality of optical transmitters by reducing a band with variable amount. However, it is not assumed in the optical transmitter described in Patent Literature 1 that various services are transmitted and received for a plurality of optical transmitters. That is to say, it is not assumed for the optical transmitter described in Patent Literature 1 to accommodate a plurality of services and transmit the plurality of services to corresponding optical transmitters respectively.

In the multi-flow optical node described in Patent Literature 2, the number of sub-carriers generated by a single carrier generator is a fixed number. Accordingly, the data of a single demanded service can be mapped over the sub-carriers generated by a plurality of carrier generators and transmitted, depending on the amount of the throughput demanded by a client. This requires a guard band with an adjacent channel for each frequency band over a plurality of carrier generators and lowers the frequency usage efficiency as a whole.

The present invention has been devised taking the above-described problems into account, and the object of the present invention is to provide an optical communication device and an optical communication system that can transmit a plurality of accommodated services to corresponding transmission destinations respectively making a guard band to be added to a transmission signal smaller.

Solution to Problem

In order to achieve the above-described object, an optical transmitter according to an exemplary aspect of the present invention includes control means for generating a control signal based on transmission information; sub-carrier adjusting means for outputting sub-carriers to a plurality of output ports according to the control signal; encoding processing means for mapping client data on a plurality of output lanes according to the control signal; and a plurality of modulation means for modulating the sub-carriers inputted through the output ports by client data inputted through the output lanes and outputting modulated signals.

In order to achieve the above-described object, an optical communication device according to an exemplary aspect of the present invention includes the first optical transmitter and the second optical transmitter, and control means for controlling the first optical transmitter and the second optical transmitter so that number of pieces of guard bands to be added to transmission signals to be transmitted from the first optical transmitter and the second optical transmitter may become smaller.

In order to achieve the above-described object, an optical communication system according to an exemplary aspect of the present invention includes a plurality of the optical communication devices configured to transmit and receive the transmission signal mutually; and control means for controlling each of the plurality of optical communication devices so that total number of pieces of guard bands to be added to transmission signals to be output from the plurality of optical communication devices may become smaller.

In order to achieve the above-described object, an optical transmission method according to an exemplary aspect of the present invention includes generating a control signal based on transmission information; mapping client data on a plurality of output lanes according to the control signal generated; outputting sub-carriers to a plurality of output ports according to the control signal generated; and outputting a plurality of modulated signals by modulating each of sub-carriers inputted through a corresponding output port by client data inputted through a corresponding output lane.

Advantageous Effects of Invention

According to the above-mentioned aspects of the present invention, it is possible to accommodate a plurality of services and transmit the plurality of accommodated services to corresponding transmission devices respectively, and to make a guard band to be added to a transmission signal to be transmitted smaller.

DESCRIPTION OF EMBODIMENTS

A First Exemplary Embodiment

Figure 1:
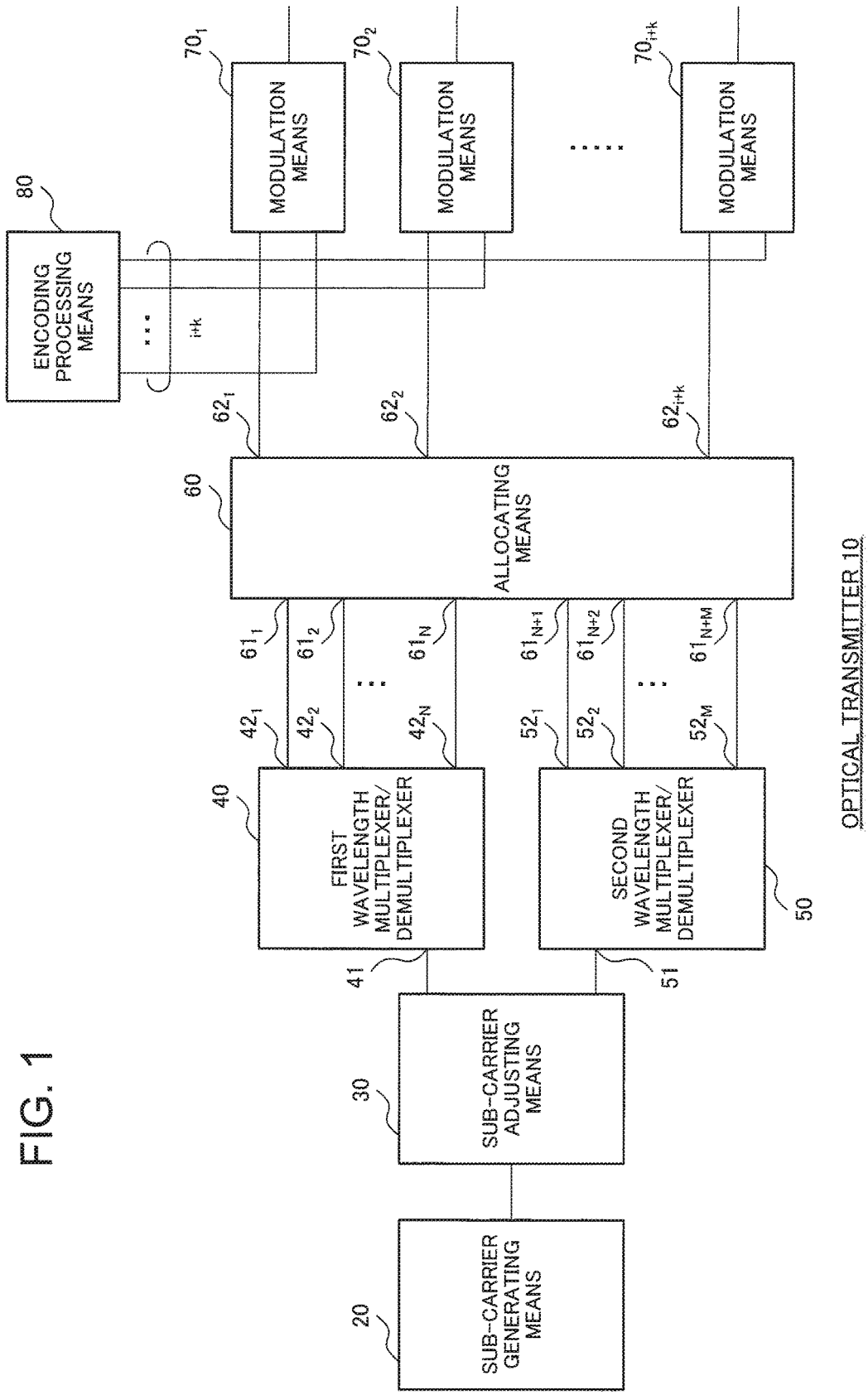
FIG. 1 is a block configuration diagram of an optical transmitter 10 in accordance with a first exemplary embodiment.

A first exemplary embodiment in accordance with the present invention will be described. FIG. 1 is a block configuration diagram of an optical transmitter in accordance with the present exemplary embodiment. In FIG. 1, an optical transmitter 10 includes a sub-carrier generating means 20, a sub-carrier adjusting means 30, a first wavelength multiplexer/demultiplexer 40, a second wavelength multiplexer/demultiplexer 50, an allocating means 60, (i+k)-pieces of modulation means $70_1$, $70_2$, ..., and $70_{i+k}$, and an encoding processing means 80. The optical transmitter 10 in accordance with the exemplary embodiment transmits client data put on transmission signals to an intended transmission device according to instructions from a network controller that is not shown in the figure. Here, the network controller controls each optical transmitter 10 so that the number of guard bands to be added to a transmission signal output from each of a plurality of optical transmitters 10 may decrease. The number of guard bands can be set at an arbitrary target value. For example, the optical transmitter 10 can be also controlled so that the number of guard bands may be at a minimum.

The sub-carrier generating means 20 generates a plurality of sub-carriers and outputs them to the sub-carrier adjusting means 30.

According to instructions from the network controller that is not shown in the figure, the sub-carrier adjusting means 30 outputs i (i≤N)-pieces of sub-carriers to be output to a first transmission device to the first wavelength multiplexer/demultiplexer 40 and outputs k (k≤M)-pieces of sub-carriers to be output to a second transmission device to the second wavelength multiplexer/demultiplexer 50, out of a plurality of inputted sub-carriers. A transmission signal to which a set of guard bands are added is generated from the i-pieces of sub-carriers to be output to the first transmission device, and a transmission signal to which a set of guard bands are added is generated from the k-pieces of sub-carriers to be output to the second transmission device.

The first wavelength multiplexer/demultiplexer 40 includes one input port 41 and N output ports $42_k$, $42_2, \ldots,$ and $42_N$, demultiplexes inputted i sub-carriers for each frequency band, and outputs the demultiplexed sub-carriers from corresponding output ports $42_1, 42_2, \ldots,$ and $42_N$ to the allocating means 60. In the present exemplary embodiment, the first wavelength multiplexer/demultiplexer 40 demultiplexes sub-carriers for each frequency band corresponding to the first transmission device.

The second wavelength multiplexer/demultiplexer 50 includes one input port 51 and M output ports $52_1$, $52_2, \ldots,$ and $52_M$, demultiplexes inputted k sub-carriers for each frequency band, and outputs the demultiplexed sub-carriers from corresponding output ports $52_1, 52_2, \ldots$ and $52_M$ to the allocating means 60. In the present exemplary embodiment, the second wavelength multiplexer/demultiplexer 50 demultiplexes sub-carriers for each frequency band corresponding to the second transmission device.

The allocating means 60 includes (N+M) input ports $61_1$, $61_2, \ldots,$ and $61_{N+M}$, and (i+k) output ports $62_1, 62_2, \ldots,$ and $62_{i+k}$. The (i+k) sub-carriers output from the first wavelength multiplexer/demultiplexer 40 and the second wavelength multiplexer/demultiplexer 50 are inputted into the allocating means 60 through any one of the (N+M) input ports $61_1, 61_2, \ldots,$ and $61_{N+M}$. The allocating means 60 allocates the inputted (i+k) sub-carriers to the (i+k) output ports $62_1, 62_2, \ldots,$ and $62_{i+k}$, and guides the sub-carriers to the (i+k) modulation means $70_1, 70_2, \ldots,$ and $70_{i+k}$, respectively.

The encoding processing means 80 makes client data inputted into the optical transmitter 10 framed according to instructions from the network controller that is not shown in the figure, and maps the framed client data on the (i+k) modulation means $70_1, 70_2, \ldots,$ and $70_{i+k}$.

Each of the (i+k) modulation means $70_1, 70_2, \ldots,$ and $70_{i+k}$ modulates an input sub-carrier using mapped client data and outputs a modulated signal. That is to say, (i+k) modulated signals are transmitted from the optical transmitter 10. As mentioned above, the optical transmitter 10 adds a set of guard bands to modulated signals generated from the i-pieces of sub-carriers extracted in the sub-carrier adjusting means 30 and outputs the modulated signals as the transmission signal to the first transmission device. Likewise, the optical transmitter 10 adds a set of guard bands to modulated signals generated from the k-pieces of sub-carriers extracted in the sub-carrier adjusting means 30 and outputs the modulated signals as the transmission signal to the second transmission device.

As mentioned above, in the optical transmitter 10 in accordance with the present exemplary embodiment, the sub-carrier adjusting means 30 outputs the i-pieces of sub-carriers to be output to the first transmission device to the first wavelength multiplexer/demultiplexer 40, and outputs the k-pieces of sub-carriers to be output to the second transmission device to the second wavelength multiplexer/demultiplexer 50, out of a plurality of sub-carriers inputted from the sub-carrier generating means 20. The first wavelength multiplexer/demultiplexer 40 demultiplexes the sub-carriers so as to correspond to the first transmission device, and the second wavelength multiplexer/demultiplexer 50 demultiplexes the sub-carriers so as to correspond to the second transmission device. Therefore, the optical transmitter 10 in accordance with the present exemplary embodiment is capable of processing a plurality of sub-carriers for each service, and is capable of transmitting the sub-carriers to a plurality of transmission devices.

In the optical transmitter 10 in accordance with the present exemplary embodiment, the first wavelength multiplexer/demultiplexer 40 includes N output ports, and the second wavelength multiplexer/demultiplexer 50 includes M output ports. Accordingly, the sub-carrier adjusting means 30 is capable of changing flexibly the ratio of the number of sub-carriers to be output to the first wavelength multiplexer/demultiplexer 40 and the second wavelength multiplexer/demultiplexer 50 in the range that (i+k) is equal to or smaller than a predetermined value. For example, it is possible to transmit transmission signals corresponding to N sub-carriers to the first transmission device, and to transmit an intended amount of transmission signals corresponding to sub-carriers whose maximum number is equal to (i+k)-N to the second transmission device.

In addition, it is possible to utilize the modulation means 70 efficiently by disposing, in the optical transmitter 10, the (i+k) modulation means $70_1, 70_2, \ldots,$ and $70_{i+k}$ whose number is equal to the number of sub-carriers to be extracted in the sub-carrier adjusting means 30.

A Second Exemplary Embodiment

Figure 2:
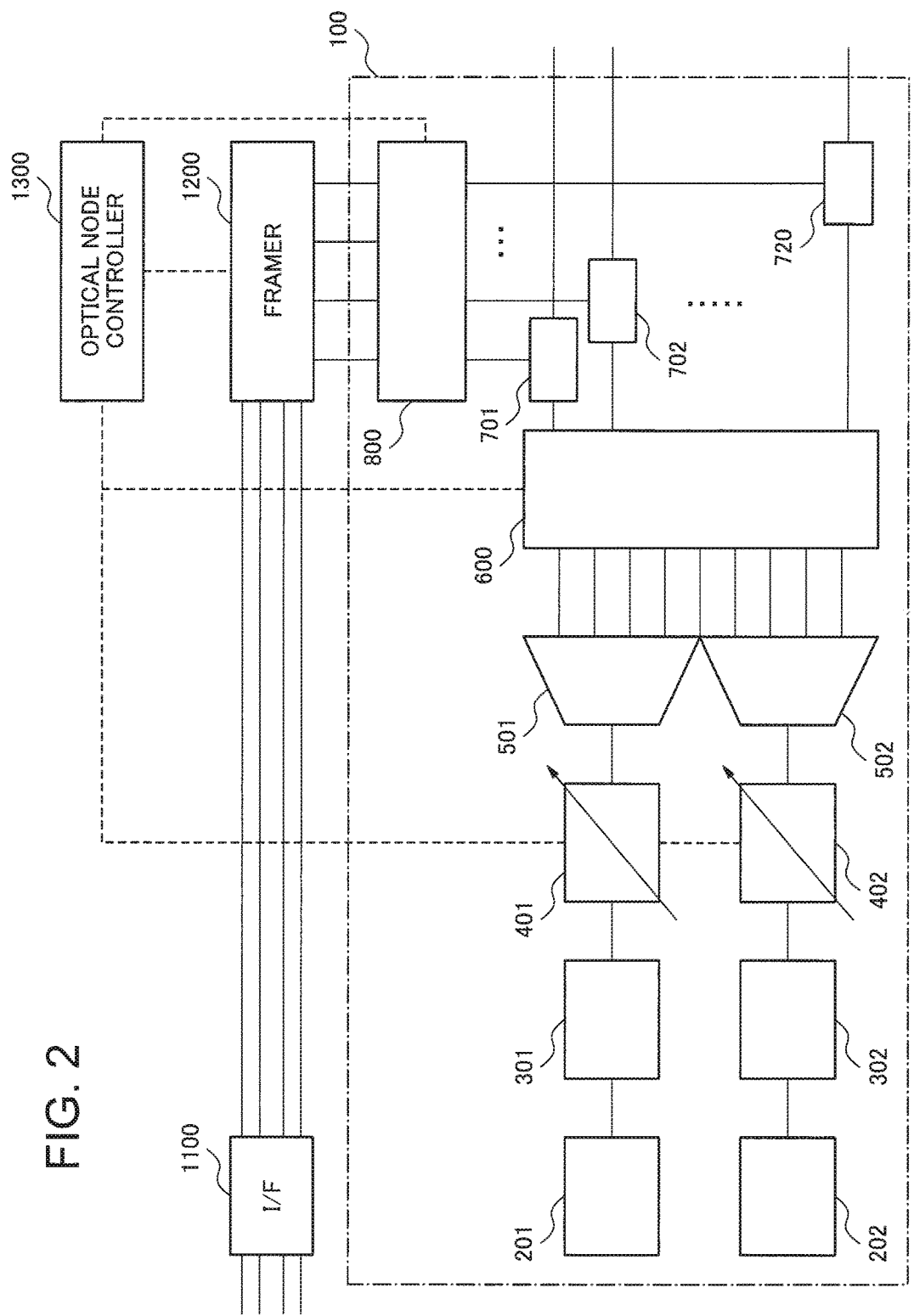
FIG. 2 is a block configuration diagram of an optical transmitter 100 in accordance with a second exemplary embodiment.

A second exemplary embodiment will be described. FIG. 2 is a block configuration diagram of an optical transmitter in accordance with the present exemplary embodiment. As illustrated in FIG. 2, an optical transmitter 100 receives input of an external client signal accommodated in a client-side interface (I/F) 1100 through a framer 1200. The framer 1200 processes data for each of a plurality of services inputted through the client-side I/F 1100 based on instructions from an optical node controller 1300, and determines the number of output lanes. The framer 1200 maps inputted client signals to correspond with the determined number of output lanes, and outputs the client signals to a signal processing unit 800 in the optical transmitter 100.

Here, the optical node controller 1300 controls the framer 1200 and the optical transmitter 100 so that a frequency band of consecutive sub-carriers may be allocated for each service depending on the amount of throughput of a plurality of demanded services. This makes the sub-carriers allocated in the optical transmitter 100 so that it may become less common that a single service is transmitted over a plurality of carriers.

The optical transmitter 100 in accordance with the present exemplary embodiment includes two carriers 201 and 202, two sub-carrier generators 301 and 302, two variable band filters 401 and 402, two wavelength multiplexers/demultiplexers 501 and 502, a single matrix optical switch 600, twenty sub-carrier modulators 701 to 720, and the signal processing unit 800.

The carriers 201 and 202 generate optical signals that become sources of sub-carriers, and output the optical signals to the sub-carrier generators 301 and 302, respectively. The carriers 201 and 202 in accordance with the present exemplary embodiment generate and output optical signals whose wavelengths differ from each other.

Each of the sub-carrier generators 301 and 302 generates, from an inputted optical signal, a plurality of sub-carriers whose oscillating frequencies correspond with a frequency grid interval of the wavelength multiplexers/demultiplexers 501 and 502, and outputs the sub-carriers to the variable band filters 401 and 402, respectively. In transmitting from the optical transmitter 100, a set of guard bands are added to sub-carriers generated in the sub-carrier generators 301 and 302.

Each of the variable band filters 401 and 402 outputs, to each of the wavelength multiplexers/demultiplexers 501 and 502, a plurality of sub-carriers inputted from each of the sub-carrier generators 301 and 302 based on a use rate on which the variable band filters 401 and 402 are instructed by the optical node controller 1300. The variable band filters 401 and 402 output sub-carriers to any one of the wavelength multiplexers/demultiplexers 501 and 502 so that the total number of sub-carriers may become equal to the number of sub-carrier modulators to be used, within the range of the number of output ports of the wavelength multiplexers/demultiplexers 501 and 502.

For example, when the number of sub-carrier modulators to be used is twenty and the number of output ports of each of the wavelength multiplexers/demultiplexers 501 and 502 is twelve, the variable band filters 401 and 402 control the total number of sub-carriers so as to be twenty. The variable band filters 401 and 402 output twenty sub-carriers based on the use rate on which the variable band filters 401 and 402 are instructed by the optical node controller 1300, within the range that each quota is equal to twelve at a maximum; for example, eleven sub-carriers are output to the wavelength multiplexer/demultiplexer 501, and nine sub-carriers are output to the wavelength multiplexer/demultiplexer 502. The optical node controller 1300 executes the control of the use rate in the variable band filters 401 and 402 in conjunction with a variable control of the number of output lanes by the framer 1200.

Each of the wavelength multiplexers/demultiplexers 501 and 502 is composed of a cyclic AWG (arrayed waveguide grating) and has an FSR (free spectral range) equivalent to a maximum variable band of each of the sub-carrier generators 301 and 302. Each of the wavelength multiplexers/demultiplexers 501 and 502 has output ports, the number of which is the same as the maximum number of sub-carriers to be inputted from each of the variable band filters 401 and 402.

The wavelength multiplexers/demultiplexers 501 and 502 demultiplex sub-carriers inputted from the variable band filters 401 and 402 for each oscillating frequency and output the demultiplexed sub-carriers from corresponding output ports. For example, each of the wavelength multiplexers/demultiplexers 501 and 502 has twelve output ports (twenty-four output ports in total). The wavelength multiplexers/demultiplexers 501 and 502 demultiplex twenty sub-carriers inputted from the variable band filters 401 and 402, and output the demultiplexed sub-carriers to the matrix optical switch 600 through twenty output ports out of the twenty-four output ports.

The matrix optical switch 600 has twenty-four input ports respectively connected to the twenty-four output ports of the wavelength multiplexers/demultiplexers 501 and 502, and twenty output ports respectively connected to the twenty sub-carrier modulators 701 to 720. The matrix optical switch 600 respectively guides twenty sub-carriers inputted from twenty output ports out of the twenty-four output ports of the wavelength multiplexers/demultiplexers 501 and 502 to the designated sub-carrier modulators 701 to 720 based on the instruction from the optical node controller 1300. That is to say, the matrix optical switch 600 is a 24×20 optical switch.

The signal processing unit 800 receives input of client signals, the number of which is equal to the determined number of the output lanes, through the client-side I/F 1100 and the framer 1200. The signal processing unit 800 performs a signal process on the inputted client signals based on the instruction from the optical node controller 1300, and outputs the processed client signals to the designated sub-carrier modulators 701 to 720.

The twenty sub-carrier modulators 701 to 720 modulate the sub-carriers inputted from the matrix optical switch 600 using the client signals inputted from the signal processing unit 800, and output modulated signals.

The optical transmitter 100 configured as described above operates as follows. That is to say, the carriers 201 and 202 respectively generate optical signals that become sources of sub-carriers, and outputs the optical signals to the sub-carrier generators 301 and 302. The sub-carrier generators 301 and 302 respectively generates a plurality of sub-carriers, each of which has a predetermined oscillating frequency, from the inputted optical signals, and outputs the sub-carriers to the variable band filters 401 and 402.

The variable band filters 401 and 402 control the number of a plurality of sub-carriers inputted from the sub-carrier generators 301 and 302 so as to be twenty based on the instruction from the optical node controller 1300, and output twelve sub-carriers at a maximum to each of the wavelength multiplexers/demultiplexers 501 and 502 based on the use rate designated by the optical node controller 1300.

The wavelength multiplexers/demultiplexers 501 and 502 demultiplex the sub-carriers inputted from the variable band filters 401 and 402 respectively, and sequentially output the demultiplexed sub-carriers from corresponding output ports to the matrix optical switch 600. The matrix optical switch 600 guides the sub-carriers inputted from the wavelength multiplexers/demultiplexers 501 and 502 to the sub-carrier modulators 701 to 720 based on the instruction from the optical node controller 1300.

The sub-carrier modulators 701 to 720 modulate the sub-carriers inputted from the matrix optical switch 600 using the client signals inputted from the signal processing unit 800, and output modulated signals. A set of guard bands is added to a group of modulated signals generated by the sub-carriers created in the sub-carrier generator 301, which results in being provided as a first service, and a set of guard bands is added to a group of modulated signals generated by the sub-carriers created in the sub-carrier generator 3021, which results in being provided as a second service.

Next, a case will be considered in which there is a transmission requirement of three services (700 Gbps, 400 Gbps, and 900 Gbps) with 2 Tbps in total to the optical transmitter 100 in accordance with the present exemplary embodiment. The service of 700 Gbps and the service of 400 Gbps are transmission requirements from an optical node device A to an optical node device B using the same route, and the service of 900 Gbps is a transmission requirement from the optical node device A to an optical node device C. For example, if each of the sub-carriers has a throughput of 100 Gbps, the total throughputs become 2 Tbps because the optical transmitter 100 in accordance with the exemplary embodiment outputs twenty sub-carriers.

Figure 3:
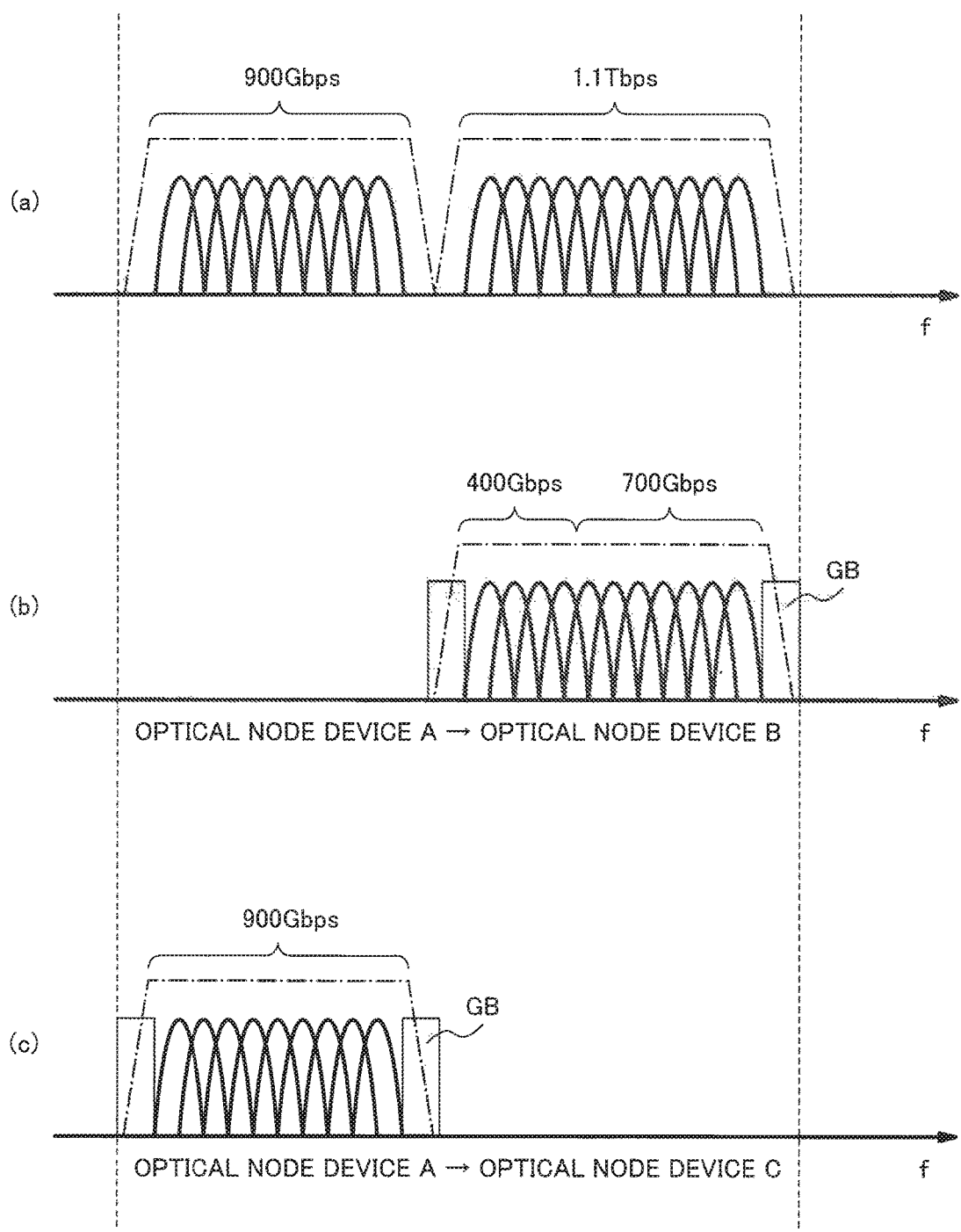
FIG. 3 is an example of spectral diagrams of transmission signals output from the optical transmitter 100 in accordance with the second exemplary embodiment.

FIG. 3 illustrates an example of the spectrum of the sub-carriers in this case. In the upper section of FIG. 3, since a throughput per sub-carrier is equal to 100 Gbps, the transmission data amount of 700 Gbps corresponds to seven sub-carriers, the transmission data amount of 400 Gbps corresponds to four sub-carriers, and the transmission data amount of 900 Gbps corresponds to nine sub-carriers.

With respect to the transmission requirement for the above-described three services, the variable band filter 401 outputs, to the wavelength multiplexer/demultiplexer 501, the sub-carriers of 1.1 Tbps obtained by adding 700 Gbps and 400 Gbps. On the other hand, the variable band filter 402 outputs the sub-carriers of 900 Gbps to the wavelength multiplexer/demultiplexer 502.

The wavelength multiplexer/demultiplexer 501 demultiplexes the sub-carriers of 1.1 Tbps inputted from the variable band filter 401 for each oscillating frequency, and outputs eleven sub-carriers to the matrix optical switch 600. On the other hand, the wavelength multiplexer/demultiplexer 502 demultiplexes the sub-carriers of 0.9 Tbps inputted from the variable band filter 402 for each oscillating frequency, and outputs nine sub-carriers to the matrix optical switch 600. The matrix optical switch 600 distributes the twenty sub-carriers inputted from the wavelength multiplexers/demultiplexers 501 and 502 among the sub-carrier modulators 701 to 720. The sub-carrier modulators 701 to 720 modulate the sub-carriers inputted from the matrix optical switch 600 using the client signals inputted from the signal processing unit 800.

Then, as illustrated in the section (b) of FIG. 3, the optical transmitter 100 in accordance with the exemplary embodiment adds a set of guard bands GB to the data of 700 Gbps and the data of 400 Gbps and then transmits the data to the optical node device B as the first service. On the other hand, as illustrated in the section (c) of FIG. 3, the optical transmitter 100 adds a set of guard bands GB to the data of 900 Gbps and then transmits the data to the optical node device C as the second service.

Figure 4:
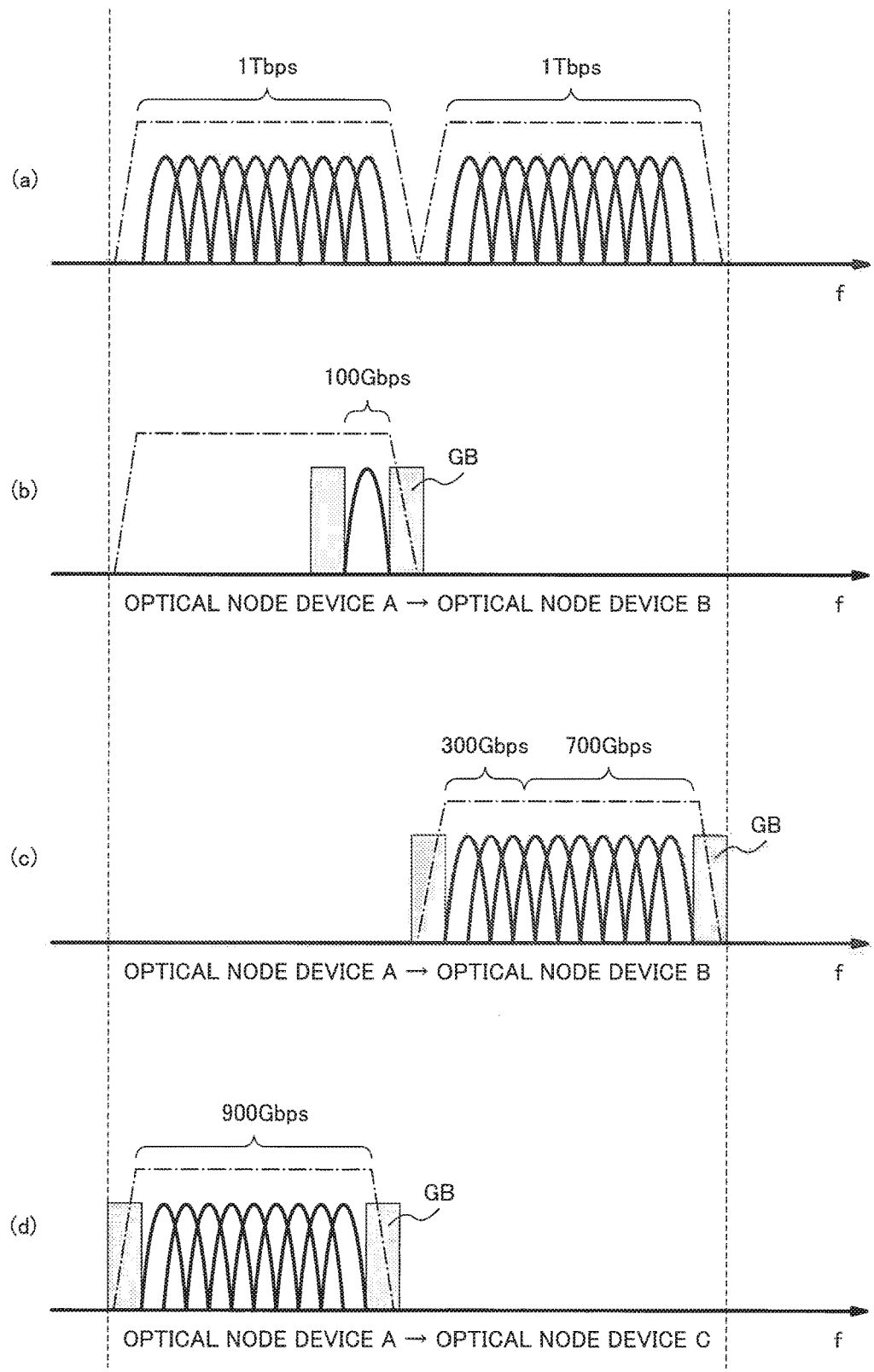
FIG. 4 is an example of spectral diagrams of transmission signals output from an optical transmitter in accordance with a comparative example of the second exemplary embodiment.

Here, a case will be considered as a comparative example in which the variable band filters 401 and 402 are not included, that is, the wavelength multiplexers/demultiplexers 501 and 502 handle a given number of sub-carriers. FIG. 4 illustrates an example of the spectral of the sub-carriers in this case. Since the wavelength multiplexers/demultiplexers 501 and 502 handle a given number of sub-carriers, the sub-carriers of 1 Tbps are inputted into each of the wavelength multiplexers/demultiplexers 501 and 502 as illustrated in the section (a) of FIG. 4.

In this case, it is necessary to process a throughput by 400 Gbps dividing 400 Gbps into 100 Gbps and 300 Gbps. As illustrated in the section (c) of FIG. 4, the data of 300 Gbps passes through the same route toward the same destination node (optical node device B) as those of the service of 700 Gbps, so there is no need to add a guard band GB; however, it is necessary to newly add a guard band GB to the data of 100 Gbps as illustrated in the section (b) of FIG. 4, which causes the decrease in the frequency usage efficiency.

As described above, the optical transmitter 100 in accordance with the present exemplary embodiment is configured to give the redundancy to the output ports of the wavelength multiplexers/demultiplexers 501 and 502, and to distribute the sub-carriers allocated to the output ports of the wavelength multiplexers/demultiplexers 501 and 502 by the variable band filters 401 and 402 among the sub-carrier modulators 701 to 720 by the matrix optical switch 600. This configuration makes it possible to efficiently allocate a frequency band of consecutive sub-carriers depending on the amount of throughput of a plurality of demanded services. That is to say, it is possible to make the guard band GB smaller and increase the frequency usage efficiency.

Although it has been described in the present exemplary embodiment that the optical transmitter 100 includes two carriers 201 and 202, two sub-carrier generators 301 and 302, two variable band filters 401 and 402, two wavelength multiplexers/demultiplexers 501 and 502, a 24×20 matrix optical switch 600, and twenty sub-carrier modulators 701 to 720, the number of respective units and the matrix scale of the switch are not limited to the above. In order to allocate the sub-carriers to the wavelength multiplexers/demultiplexers 501 and 502, the variable band filters are used, but not limited to this; for example, it is also possible to apply an optical multicast switch that multicasts a plurality of input signals and outputs the input signals to a plurality of output ports, instead of the two variable band filters.

A Modification Example of the Second Exemplary Embodiment

Figure 5:
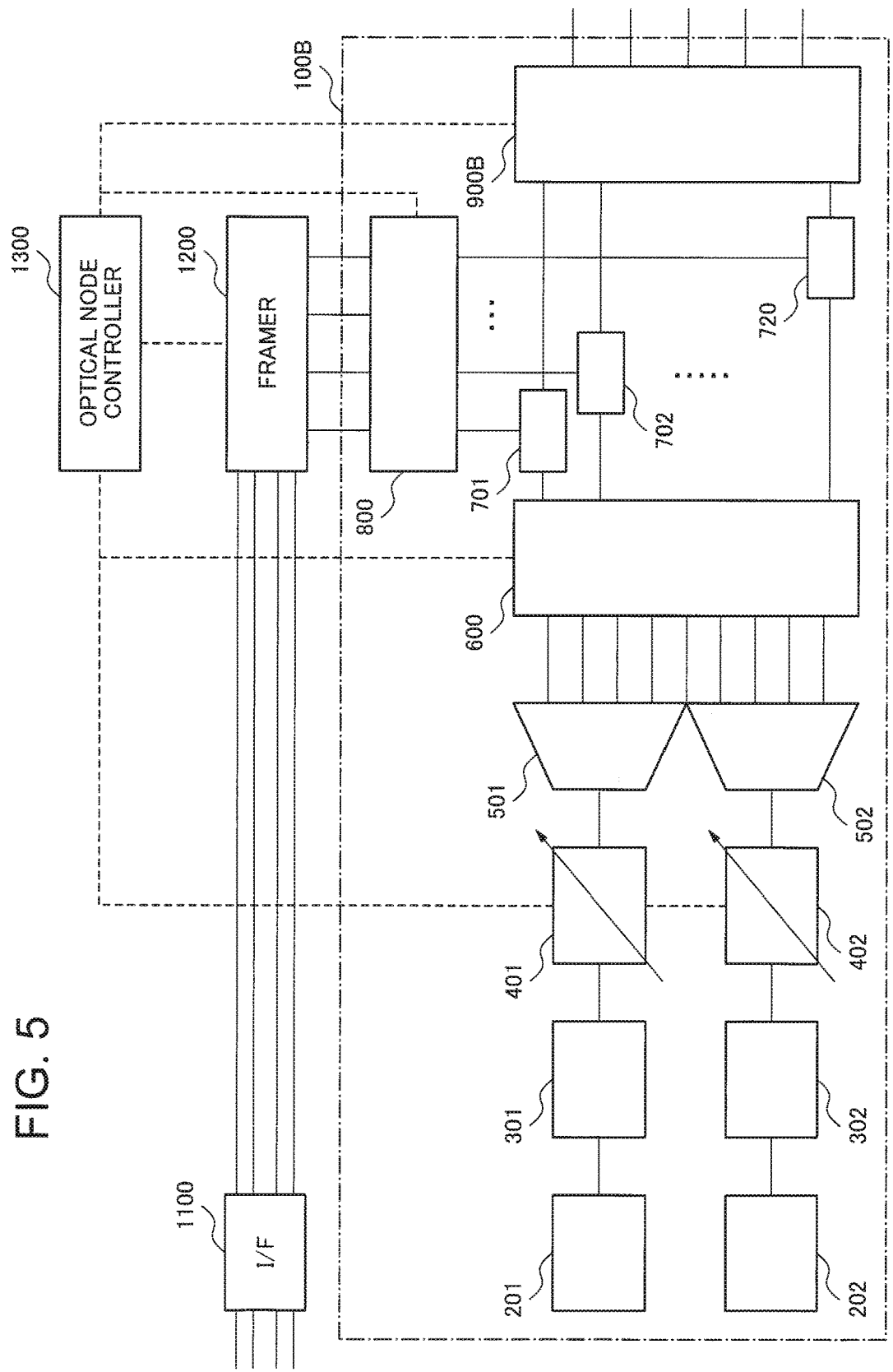
FIG. 5 is a block configuration diagram of an optical transmitter 100B in accordance with a modified example of the second exemplary embodiment.

A modification example of the second exemplary embodiment will be described. FIG. 5 is a block configuration diagram of an optical transmitter in accordance with the present exemplary embodiment. As illustrated in FIG. 5, an optical transmitter 100B in accordance with the present exemplary embodiment is configured in which an optical multicast switch 900B is added to the optical transmitter 100 in FIG. 2 that is described in the second exemplary embodiment. Carriers 201 and 202, sub-carrier generators 301 and 302, variable band filters 401 and 402, wavelength multiplexers/demultiplexers 501 and 502, a matrix optical switch 600, sub-carrier modulators 701 to 720, and a signal processing unit 800 function as with those described in the second exemplary embodiment, so the detailed description of those units is omitted.

The optical multicast switch 900B has the function of not only connecting up arbitrary input and output ports on a one-to-one basis but also connecting input signals to a plurality of output ports on a one-to-N basis multicasting the input signals. The optical multicast switch 900B is disposed in a stage following the sub-carrier modulators 701 to 720, and transmits modulated signals output from the sub-carrier modulators 701 to 720 to a multitude of optical fibers for inputting and outputting an optical signal into and from an optical transmission device and an optical transmitter/receiver, according to instructions from the optical node controller 1300, without any physical limitation such as a wavelength to be used and a connecting fiber.

A plurality of outputs of the optical multicast switch 900B are respectively connected to a plurality of optical fibers for inputting and outputting an optical signal into and from an optical transmission device. An optical fiber for inputting and outputting an optical signal into and from an optical transmission device is generally called a route. Disposing the optical multicast switch 900B makes it possible to perform optical transmission without any limitation of physical connection such as wavelength limitation, route limitation, and wavelength limitation in connection between the optical transmitter 100B and a plurality of routes. The optical multicast switch 900B, which corresponds to output means described in the claims, aggregates the modulated signals output from the sub-carrier modulators 701 to 720 according to the instructions from the optical node controller 1300, adds a guard band to the aggregated signals, and outputs the resultant signal as a transmission signal.

As is the case with the second exemplary embodiment, a case will be considered in which there is a transmission requirement of three services (700 Gbps, 400 Gbps, and 900 Gbps) with 2 Tbps in total to the optical transmitter 100B. The service of 700 Gbps and the service of 400 Gbps are transmissions from the optical node device A to the optical node device B using the same route, and the service of 900 Gbps is a transmission from the optical node device A to the optical node device C using another route.

The variable band filter 401 outputs the sub-carriers of 1.1 Tbps out of a plurality of sub-carriers inputted from the sub-carrier generator 301 to the wavelength multiplexer/demultiplexer 501, and the variable band filter 402 outputs the sub-carriers of 0.9 Tbps out of a plurality of sub-carriers inputted from the sub-carrier generator 302 to the wavelength multiplexer/demultiplexer 502. The wavelength multiplexers/demultiplexers 501 and 502 demultiplex the inputted sub-carriers for each oscillating frequency and output the demultiplexed sub-carriers to the matrix optical switch 600.

The matrix optical switch 600 distributes twenty sub-carriers in total inputted from the wavelength multiplexers/demultiplexers 501 and 502 among the twenty sub-carrier modulators 701 to 720. The sub-carrier modulators 701 to 720 modulate the inputted sub-carriers using the client signals inputted from the signal processing unit 800, and output the modulated signals to the optical multicast switch 900B.

The optical multicast switch 900B aggregates twenty modulated signals inputted from the sub-carrier modulators 701 to 720 in a single output port for each service according to the instructions from the optical node controller 1300. That is to say, seven modulated signals for the service of 700 Gbps and four modulated signals for the service of 400 Gbps are aggregated in the same output port of the optical multicast switch 900B, and then are output as a transmission signal. Nine modulated signals for the service of 900 Gbps are aggregated in another output port of the optical multicast switch 900B, and then are output as a transmission signal.

That is to say, twenty modulated signals in total generated within the optical transmitter 100B are aggregated in a single output port for each service in the optical multicast switch 900B, and are output to an arbitrary input-output fiber as a transmission signal. For example, if the optical transmitter 100B in accordance with the present exemplary embodiment is connected to eight routes, a 20×8 optical multicast switch 900B is applied.

Here, the number of carriers 201 and 202, the number of sub-carrier generators 301 and 302, the number of variable band filters 401 and 402, the number of wavelength multiplexers/demultiplexers 501 and 502, and the number of sub-carrier modulators 701 to 720 are not limited to the above. The switch scale of the matrix optical switch 600 and the switch scale of the optical multicast switch 900B are not limited to the above. In addition, there is no need to dispose the optical multicast switch 900B within the optical transmitter 100B. It is also possible to dispose one optical multicast switch 900B within an optical node device to accommodate a plurality of optical transmitters 100B and control connections between the plurality of optical transmitters 100B and each of the routes.

A Third Exemplary Embodiment

Figure 6:
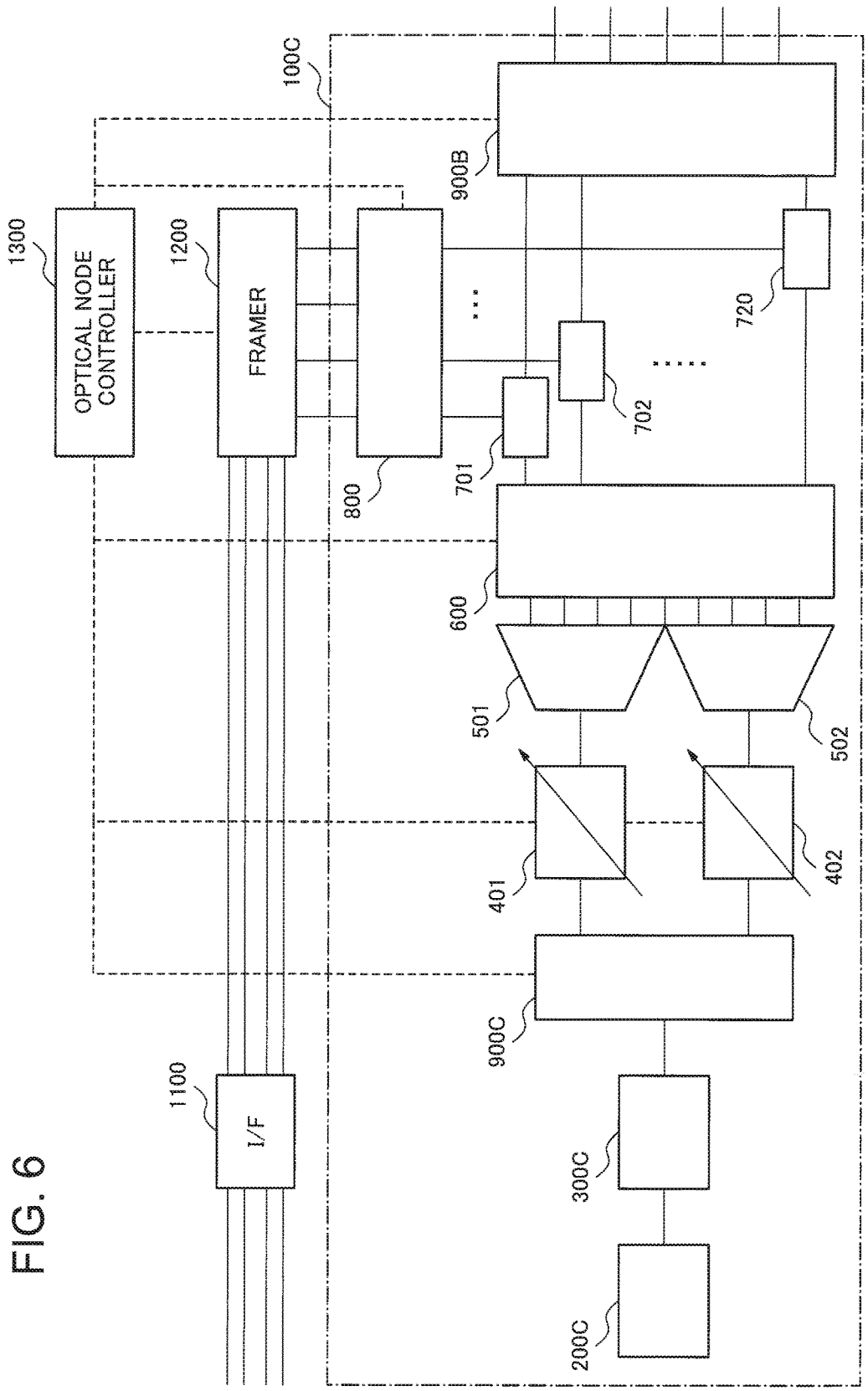
FIG. 6 is a block configuration diagram of an optical transmitter 100C in accordance with a third exemplary embodiment.

The third exemplary embodiment will be described. FIG. 6 is a block configuration diagram of an optical transmitter in accordance with the present exemplary embodiment. As illustrated in FIG. 6, an optical transmitter 100C in accordance with the present exemplary embodiment is configured by replacing the two carriers 201, 202 and the two sub-carrier generators 301, 302 with a single carrier 200C and a single sub-carrier generator 300C respectively, and disposing a 1×2 optical multicast switch 900C between the sub-carrier generator 300C and the variable band filters 401 and 402, in the optical transmitter 100B in FIG. 5 described in the modification example of the second exemplary embodiment.

The optical multicast switch 900C switches or distributes the sub-carriers inputted from the sub-carrier generator 300C to one of the two variable band filters 401 and 402 based on the use rate on which an optical node controller 1300 instructs the optical multicast switch 900C.

Figure 7:
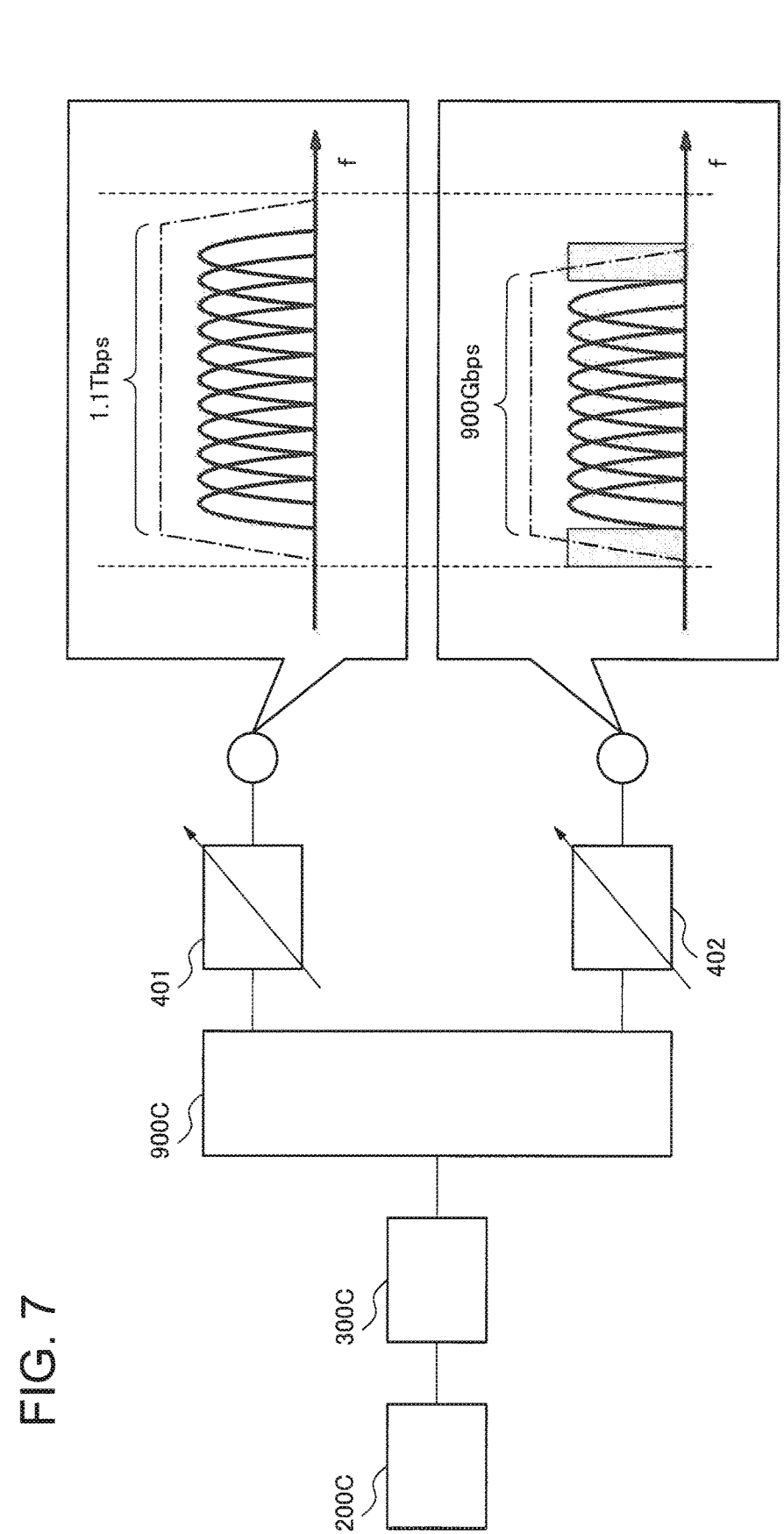
FIG. 7 is an example of spectral diagrams of transmission signals output from the optical transmitter 100C in accordance with the third exemplary embodiment.

Since there is a single carrier 200C in the present exemplary embodiment, sub-carriers having the same frequency band are inputted into the variable band filters 401 and 402. The variable band filters 401 and 402 control a plurality of sub-carriers having the same frequency band inputted from the optical multicast switch 900C so that the total number of sub-carriers may become equal to the number of sub-carrier modulators 701 to 720 to be used according to the instructions from the optical node controller 1300, and output the sub-carriers to the wavelength multiplexers/demultiplexers 501 and 502 respectively based on the designated use rate. FIG. 7 illustrates an example of spectra of the transmission signals output from the optical transmitter 100C in accordance with the present exemplary embodiment.

Since it is impossible to transmit two sets of transmission signals on the same frequency band through the same optical fiber, two sets of transmission signals generated by two sets of sub-carriers output from the optical multicast switch 900C are transmitted through separate optical fibers out of a plurality of optical fibers that are connected to the optical transmitter 100C.

Although the number of each of the carrier 200C and the sub-carrier generator 300C is set at one in the present exemplary embodiment, the number of them is not limited to the above. For example, it is also possible to dispose one carrier and two sub-carrier generators and to distribute optical signals from the carrier among the two sub-carrier generators.

If the wavelength multiplexers/demultiplexers 501 and 502 handle sub-carriers in the same frequency band, it is also possible to process the sub-carriers output from the sub-carrier generator 300C in a single wavelength multiplexer/demultiplexer, and to extract twenty sub-carriers and allocate the extracted sub-carriers to the sub-carrier modulators 701 to 720 by a matrix optical switch 600 based on the instructions from the optical node controller 1300. In this case, although the load of the matrix optical switch 600 increases, it is possible to omit the optical multicast switch 900C and the variable band filters 401 and 402 and to reduce the number of wavelength multiplexers/demultiplexers, which enables to reduce the cost.

A Fourth Exemplary Embodiment

Figure 8A:
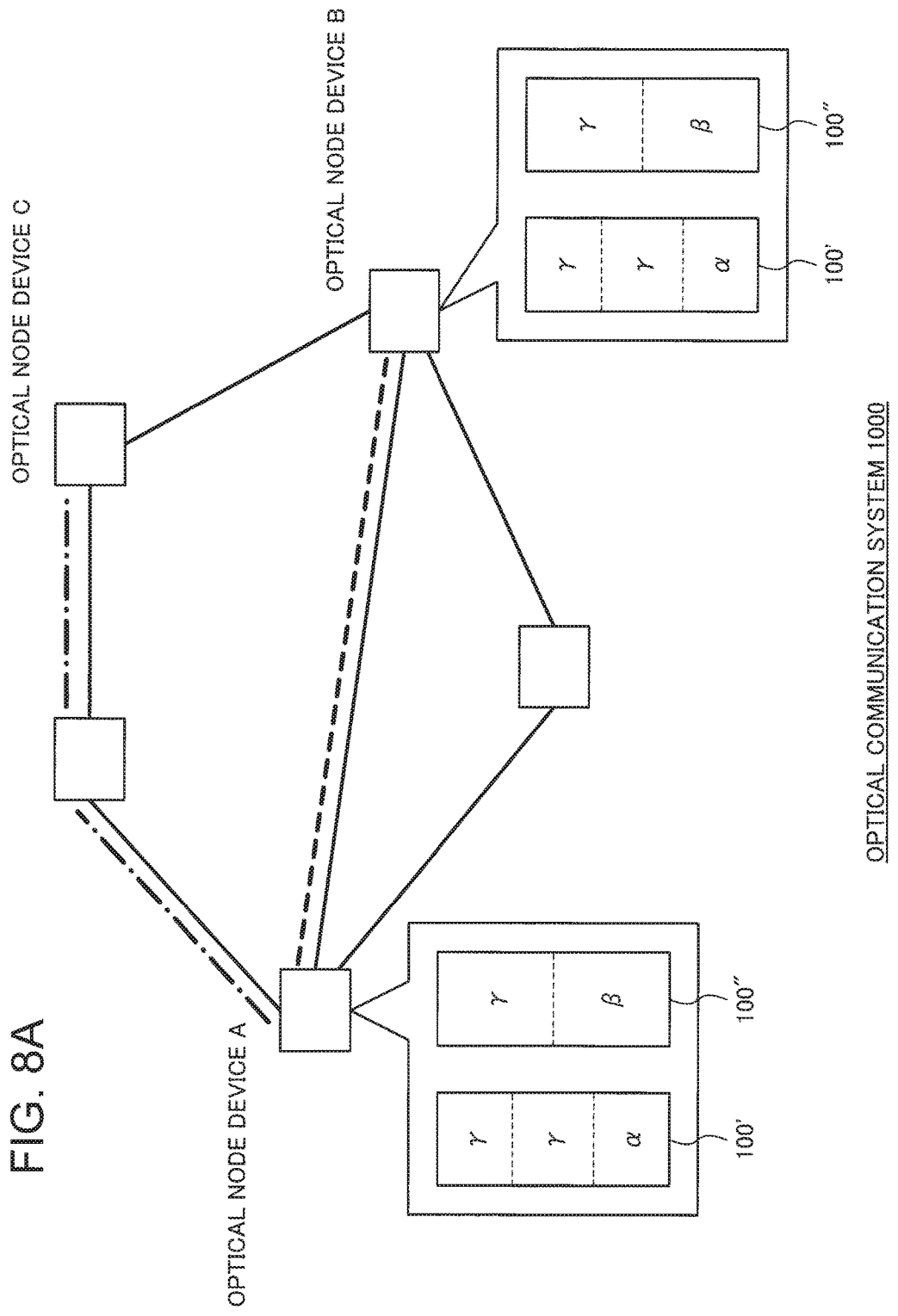
FIG. 8A is a system configuration diagram of an optical communication system 1000 in accordance with a fourth exemplary embodiment.

The fourth exemplary embodiment will be described. FIG. 8A is a system configuration diagram of an optical communication system in accordance with the present exemplary embodiment. In FIG. 8A, an optical communication system 1000 includes at least three optical node devices A, B, and C.

Figure 8B:
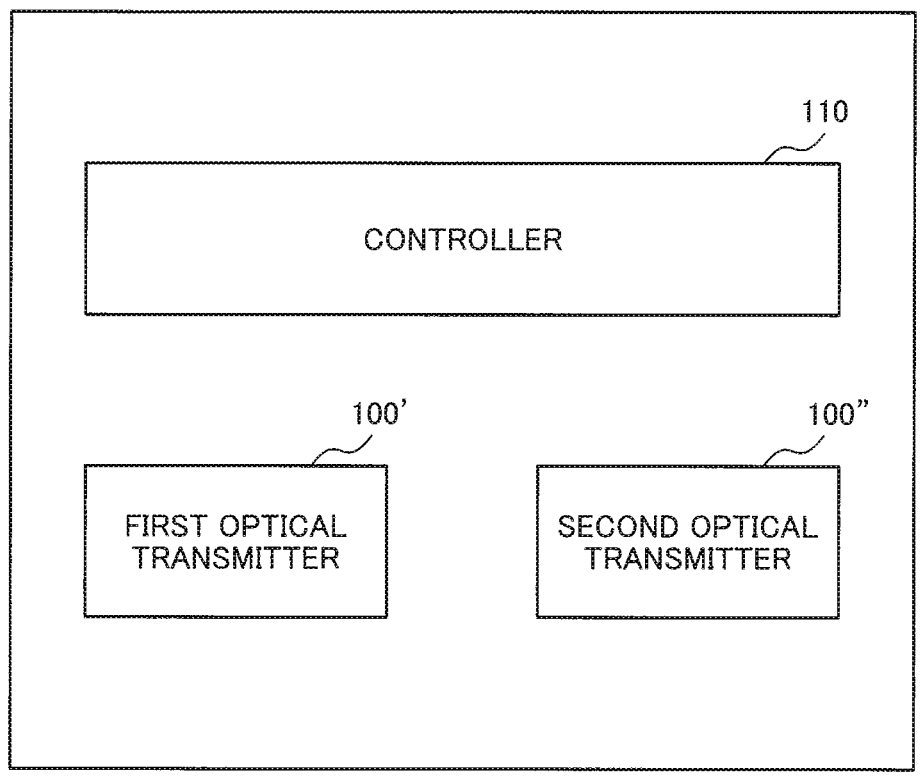
FIG. 8B is a block configuration diagram of an optical node device A in accordance with the fourth exemplary embodiment.

FIG. 8B is a block configuration diagram of the optical node device A. The optical node devices B and C are similarly configured. In FIG. 8B, the optical node device A includes a first optical transmitter 100', a second optical transmitter 100", and a controller 110. The first optical transmitter 100' and the second optical transmitter 100" are configured as with the optical transmitter 100 in FIG. 2 described in the second exemplary embodiment. That is to say, each of the first optical transmitter 100' and the second optical transmitter 100" includes carriers 201 and 202, sub-carrier generators 301 and 302, variable band filters 401 and 402, wavelength multiplexers/demultiplexers 501 and 502, a matrix optical switch 600, sub-carrier modulators 701 to 720, and a signal processing unit 800, and is capable of accommodating a plurality of services simultaneously.

The controller 110 controls the first optical transmitter 100' and the second optical transmitter 100" so that the number of guard bands to be added to a transmission signal transmitted from the first optical transmitter 100' and the second optical transmitter 100" may decrease. The controller 110 aggregates a plurality of modulated signals generated in the first optical transmitter 100' and the second optical transmitter 100" for each transmission destination, and transmits the aggregated signals to an corresponding route after adding a guard band.

Here, the optical communication system 1000 in accordance with the exemplary embodiment is characterized by the configuration that a throughput α of an operational service and a throughput β of a service for a single failure with respect to the service are not accommodated in the same optical transmitter, that is, in the same hardware component. Specifically, the first optical transmitter 100' accommodates the throughput α of the operational service and a throughput γ of another service, and the second optical transmitter 100" accommodates the throughput β of the service for the single failure with respect to the above-mentioned operational service and the throughput γ of another service.

If the throughput α of the operational service and the throughput β standing by for the single failure with respect to the operational system are accommodated in the same optical transmitter 100, it is impossible to restore the optical communication system if failures occur in the optical transmitter 100. In contrast, accommodating the throughput α of the operational service and the throughput β of the service for the single failure with respect to the operational service in the separate optical transmitters 100' and 100" makes it possible to handle failures even though a line failure such as fiber disconnection occurs simultaneously with a failure of an optical transmitter/receiver.

Although the configuration has been described in the present exemplary embodiment that each of the optical node devices A, B, and C includes two optical transmitters 100 described in the second exemplary embodiment, the optical node devices A, B, and C may include a plurality of optical transmitters each of which is one of the optical transmitters 100, 100B, and 100C described in the second exemplary embodiment, the modification example of the second exemplary embodiment, and the third exemplary embodiment.

A Fifth Exemplary Embodiment

Figure 9:
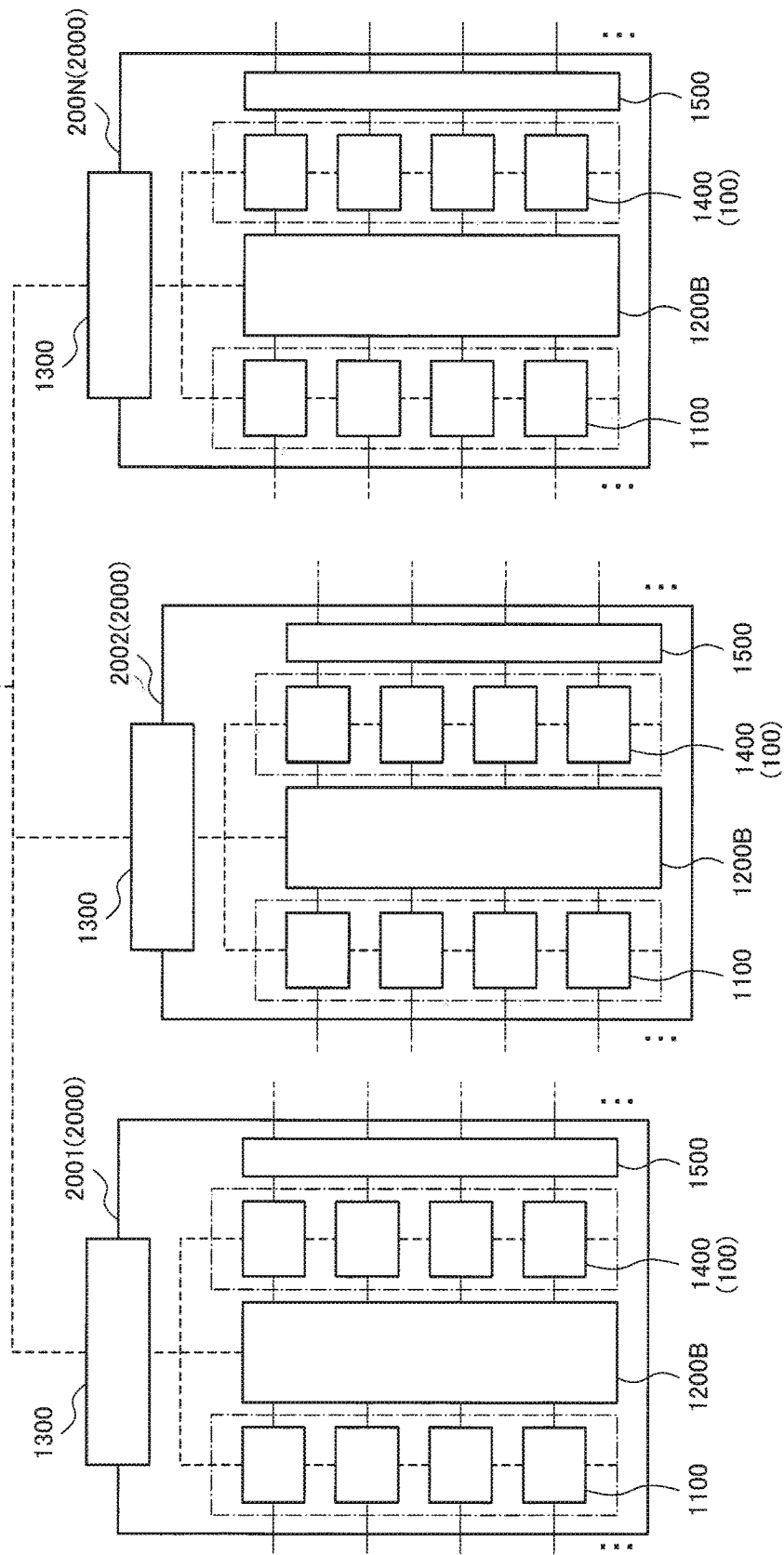
FIG. 9 is a system configuration diagram of an optical communication system 1000B in accordance with a fifth exemplary embodiment.

A fifth exemplary embodiment will be described. FIG. 9 is a system configuration diagram of an optical communication system in accordance with the present exemplary embodiment. In FIG. 9, an optical communication system 1000B includes N-pieces of optical node devices 2001, 2002, . . . , and 200N, and a network controller 1600. Each of N-pieces of the optical node devices 2001, 2002, . . . , and 200N includes an optical node controller 1300, a plurality of client-side interface (I/F) units 1100, a cross-connect unit 1200B, a plurality of line-side interface (I/F) units 1400, and an optical multicast switch 1500. The optical node devices 2001, 2002, . . . , and 200N are simply expressed as optical node device 2000 if there is no need to distinguish them specifically.

In the present exemplary embodiment, a cross-connect switch based on the framer 1200 in FIG. 2 described in the second exemplary embodiment is applied to the cross-connect unit 1200B, and the optical transmitter 100 in FIG. 2 described in the second exemplary embodiment is applied to the line-side I/F 1400. That is to say, as is the case with the optical transmitter 100 in FIG. 2 described in the second exemplary embodiment, the line-side I/F 1400 includes two carriers 201 and 202, two sub-carrier generators 301 and 302, two variable band filters 401 and 402, two wavelength multiplexers/demultiplexers 501 and 502, the matrix optical switch 600, twenty sub-carrier modulators 701 to 720, and the signal processing unit 800. Each of the sub-carrier generators 301 and 302 is capable of generating up to twelve sub-carriers, and each of the twenty sub-carrier modulators 710 to 720 has a throughput of 100 Gbps per carrier. In other words, one line-side I/F 1400 has a throughput of 2 Tbps.

Figure 10:
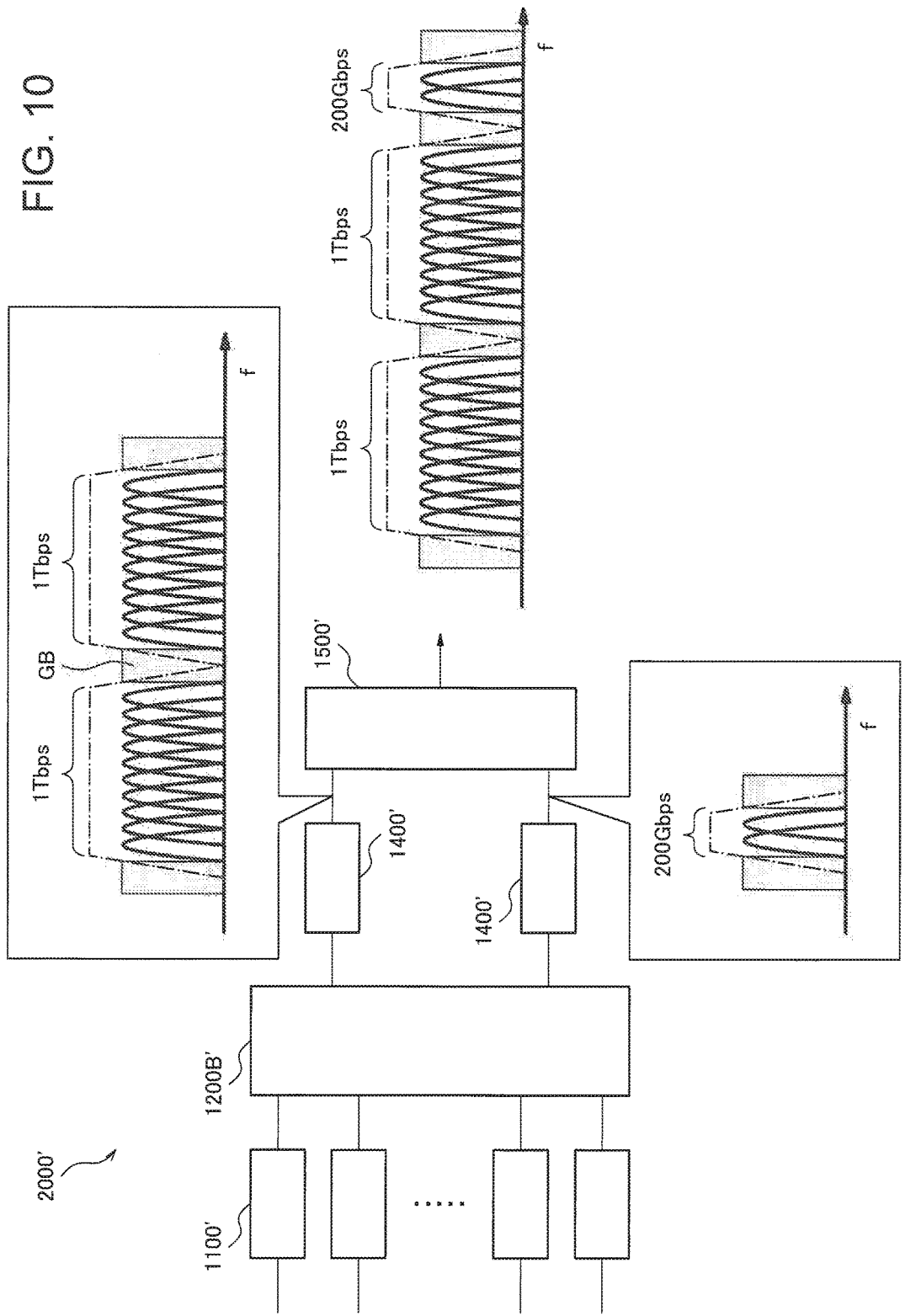
FIG. 10 is an example of spectral diagrams of transmission signals output from an optical node device 2000' in accordance with a comparative example of the fifth exemplary embodiment.

A case will be described below in which the amount of the demanded throughput from the network controller 1600 exceeds a transmission throughput capability value of one line-side I/F 1400 (optical transmitter 100). For example, a case will be considered in which a demanded throughput of 2.2 Tbps is sent end to end from the network controller 1600, and the optical node controller 1300 processes the demanded throughput by two line-side I/Fs 1400. FIG. 10 illustrates an example of the spectrums of sub-carriers handled in a conventional optical node device 2000', and FIG. 11 illustrates an example of the spectrums of sub-carriers handled in the optical node device 2000 in accordance with the present exemplary embodiment.

As illustrated in FIG. 10, if an optical node controller 1300' in the conventional optical node device 2000' receives a demand for twenty-two sub-carriers, the optical node controller 1300' uses a first line-side I/F 1400' for twenty sub-carriers from and uses a second line-side I/F 1400' for remaining two sub-carriers. That is to say, if there is a demanded throughput of 2.2 Tbps, the throughput of 2.2 Tbps is divided into a throughput of 2 Tbps and a throughput of 200 Gbps. However, as illustrated in FIG. 10, this method needs to add a guard band GB for separating carriers in addition to a set of guard bands for separating the services.

Figure 11:
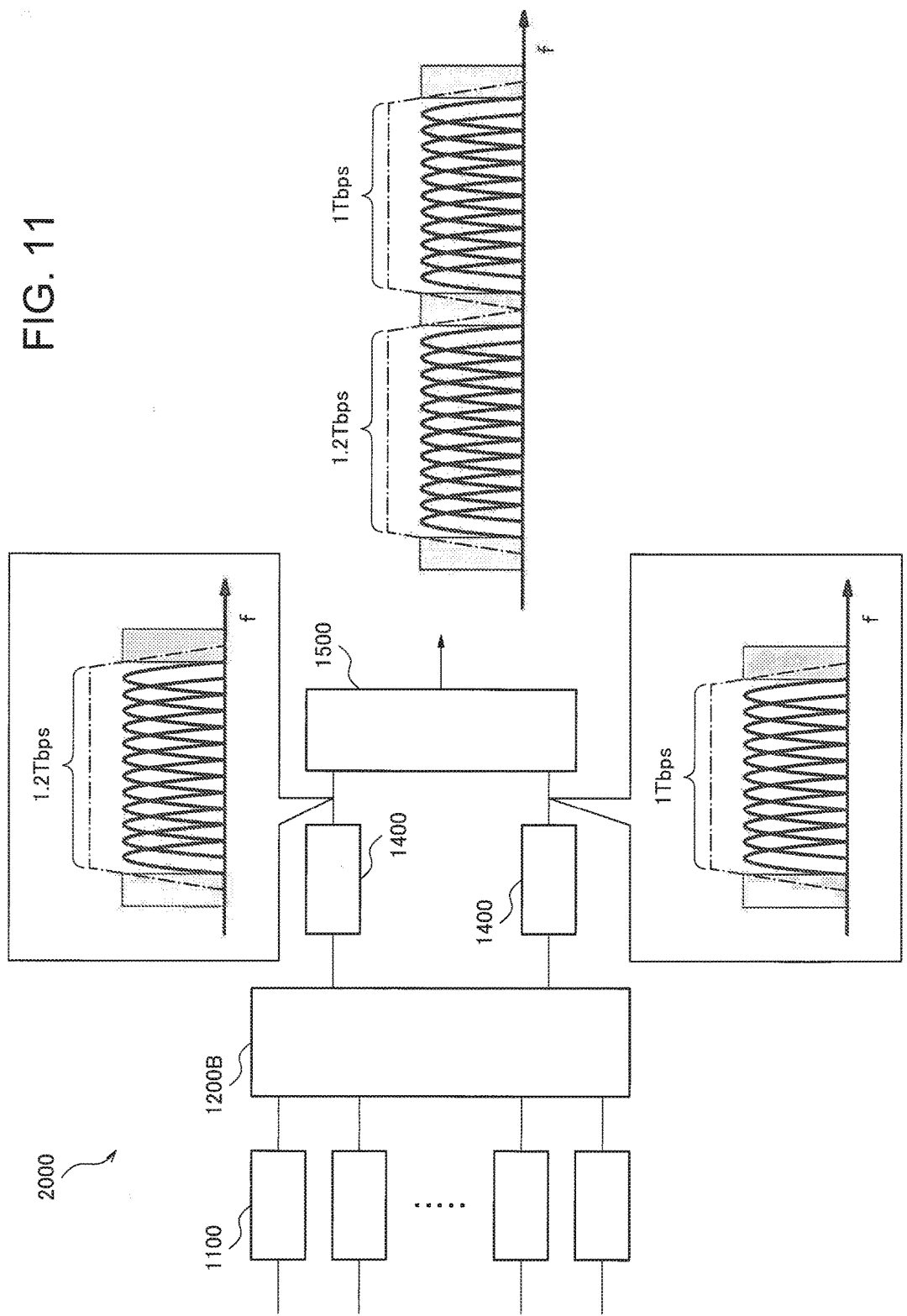
FIG. 11 is an example of spectral diagrams of transmission signals output from an optical node device 2000 in accordance with the fifth exemplary embodiment.

On the other hand, as illustrated in FIG. 11, in the optical node device 2000 in accordance with the present exemplary embodiment, if the optical node controller 1300 receives a demand for twenty-two sub-carriers, the optical node controller 1300 uses a first line-side I/F 1400 for twelve sub-carriers and uses a second line-side I/F 1400 for ten sub-carriers by controlling the cross-connect unit 1200B. That is to say, the optical node controller 1300 makes the first line-side I/F 1400 handle client signals by 1.2 Tbps and the second line-side I/F 1400 handle client signals by 1.0 Tbps by controlling the cross-connect unit 1200B.

In this case, in the first line-side I/F 1400, the client signals by 1.2 Tbps are output from the client-side I/F unit 1100 to twelve sub-carrier modulators (the sub-carrier modulators 701 to 712, for example) through the signal processing unit 800. On the other hand, the sub-carriers by 1.2 Tbps are generated in the sub-carrier generator 301 and are output to the twelve sub-carrier modulators 701 to 712 through the variable band filter 401, the wavelength multiplexer/demultiplexer 501, and the matrix optical switch 600.

The sub-carriers from the matrix optical switch 600 and the client signals from the signal processing unit 800 are inputted into each of the twelve sub-carrier modulators 701 to 712. The sub-carriers are modulated using the client signals, and then twelve modulated signals are generated. The first line-side I/F 1400 outputs the generated twelve modulated signals to the optical multicast switch 1500 after adding a set of guard bands to them. Since it is possible to generate the sub-carriers in the sub-carrier generator 301 alone, there is no need to include a guard band GB for separating the carriers.

On the other hand, in the second line-side I/F 1400, the client signals by 1.0 Tbps and the sub-carriers are inputted into ten sub-carrier modulators (the sub-carrier modulators 701 to 710, for example). The second line-side I/F 1400 outputs ten modulated signals generated in the ten sub-carrier modulators 701 to 710 to the optical multicast switch 1500 after adding a set of guard bands to them.

The optical multicast switch 1500 transfers the throughput of 1.2 Tbps inputted from the first line-side I/F 1400 to an intended optical node device as a first service, and transfers the throughput of 1.0 Tbps inputted from the second line-side I/F 1400 to an intended optical node device as a second service.

As described above, in the optical communication system 1000B in accordance with the present exemplary embodiment, the optical node controller 1300 controls a combination of the line-side I/Fs 1400 to be used depending on the throughput of the line-side I/F 1400, which makes it possible to maximize the usage efficiency of hardware resources in the optical node device 2000.

In addition, in the optical communication system 1000B in accordance with the present exemplary embodiment, the optical node controller 1300 controls the sub-carriers generated by a plurality of line-side I/Fs 1400 that are accommodated in the optical node device 2000 per optical node device 2000 so as to become equal to or smaller than the number of the sub-carriers generated in the sub-carrier generator 301 alone; for example, twenty-two sub-carriers are divided into ten sub-carriers and twelve sub-carriers, and two line-side I/Fs 1400 are used. This makes it possible to decrease the number of the guard bands GB.

A Sixth Exemplary Embodiment

Figure 12:
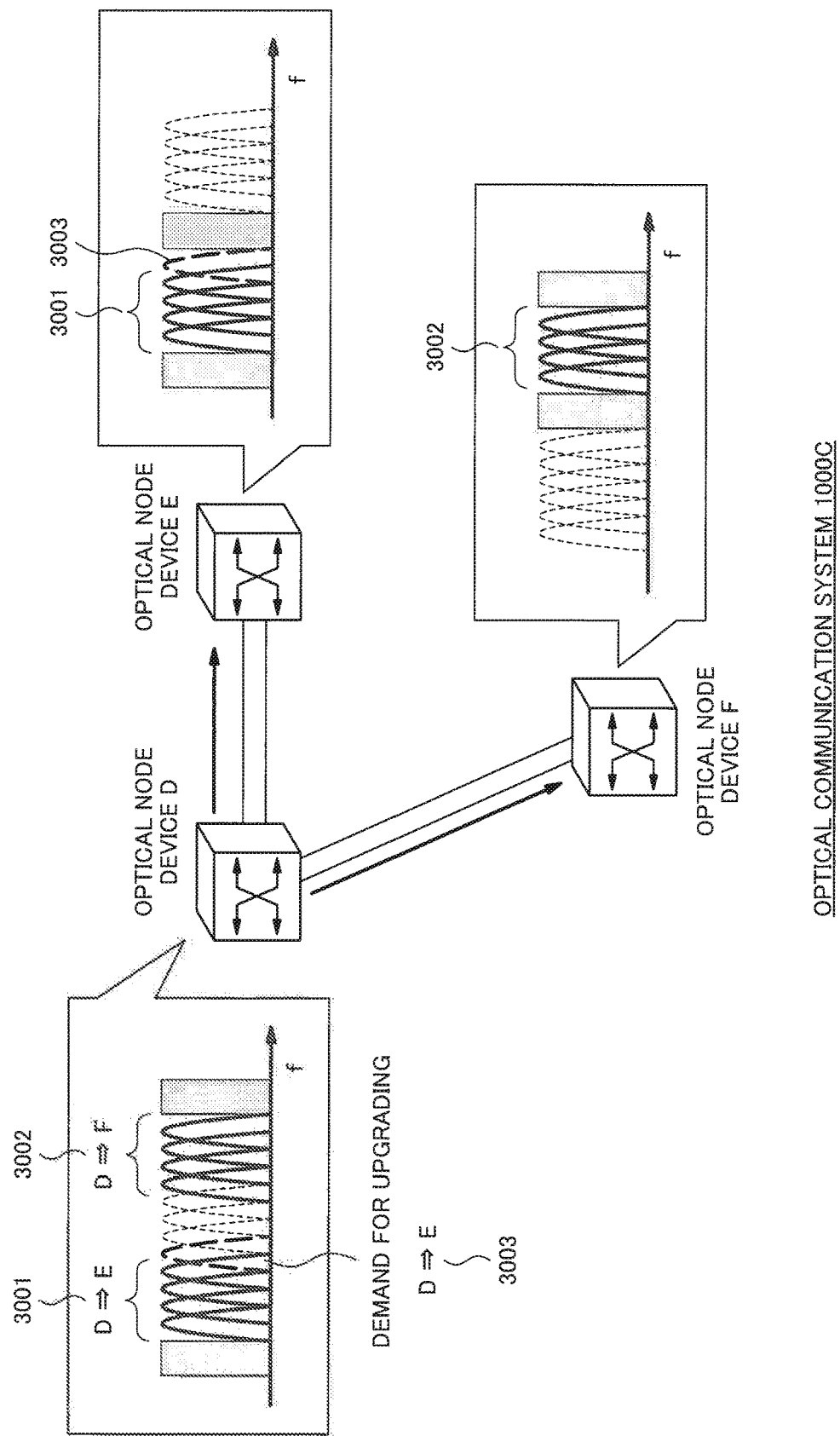
FIG. 12 is an example of spectral diagrams of transmission signals handled in an optical communication system 1000C in accordance with a sixth exemplary embodiment.

The sixth exemplary embodiment will be described. FIG. 12 is a system configuration diagram of an optical communication system in accordance with the present exemplary embodiment. An optical communication system 1000C in accordance with the present exemplary embodiment is characterized by use of a plurality of consecutive sub-carriers that are not adjacent to each other, for each of a plurality of services.

In FIG. 12, the optical communication system 1000C includes at least three optical node devices D, E, and F. Each of the optical node devices D, E, and F includes two optical transmitters 100 in FIG. 2 described in the second exemplary embodiment. One of the two optical transmitters 100 is expressed as a third optical transmitter 100', and the other of them is expressed as a fourth optical transmitter 100" below. Each of the third optical transmitter 100' and the fourth optical transmitter 100" includes carriers 201 and 202, sub-carrier generators 301 and 302, variable band filters 401 and 402, wavelength multiplexers/demultiplexers 501 and 502, a matrix optical switch 600, sub-carrier modulators 701 to 720, and a signal processing unit 800, and is capable of accommodating a plurality of services simultaneously.

For example, an optical transmitter accommodated in the optical node device D accommodates two services in a single consecutive sub-carrier band. Specifically, a service 3001 is transferred from the optical node device D to the optical node device E, and a service 3002 is transferred from the optical node device D to the optical node device F. Here, a case will be considered in which a demand arises additionally for upgrading a communication throughput from the optical node device D to the optical node device E when the services 3001 and 3002 are transferred from the optical node device D. FIG. 12 also illustrates spectral diagrams of the transmission signals in the optical communication system 1000C in accordance with the present exemplary embodiment in this case, and FIG. 13 illustrates spectral diagrams of transmission signals in a conventional optical communication system 1000'.

Figure 13:
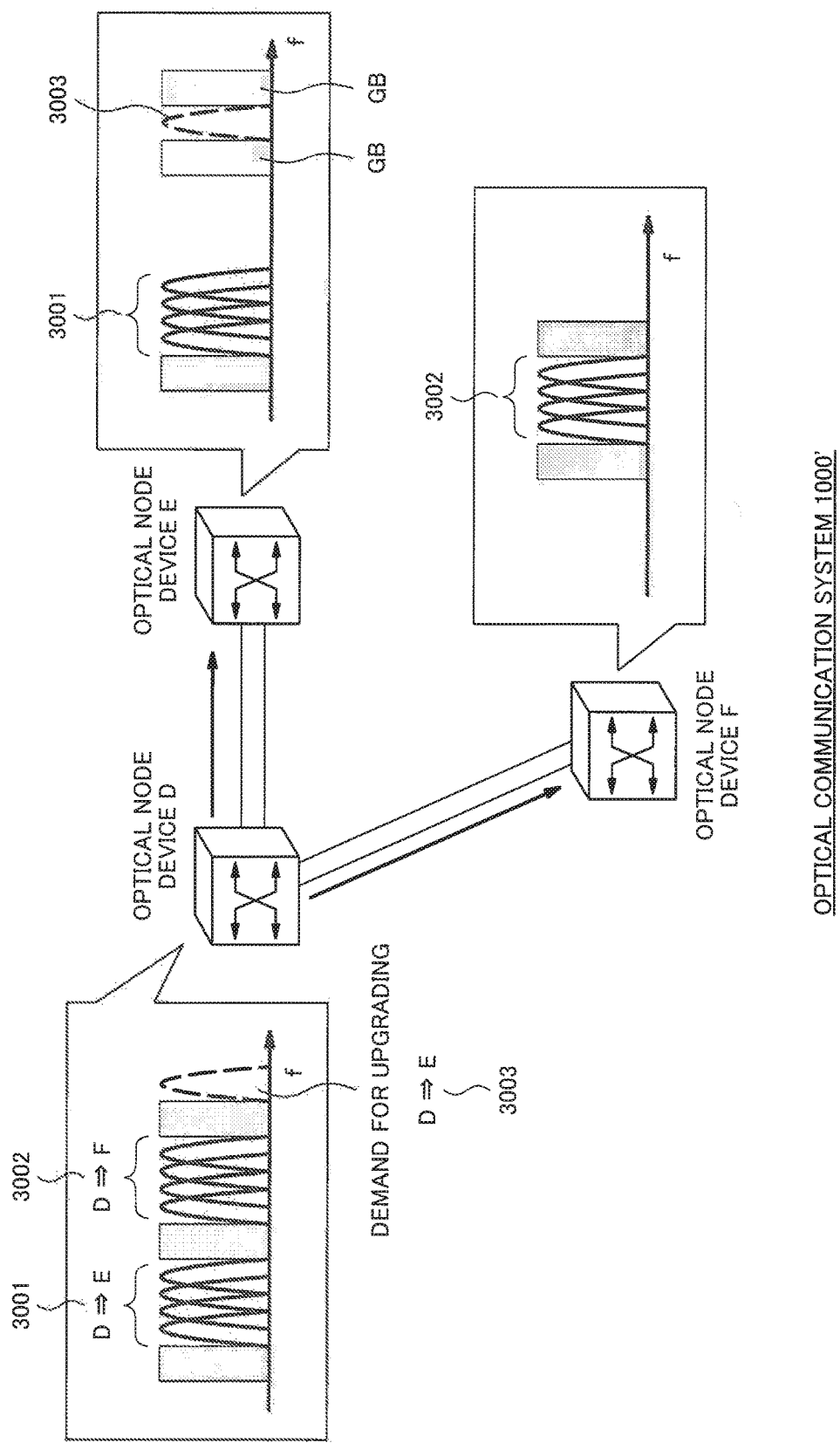
FIG. 13 is an example of spectral diagrams of transmission signals handled in an optical communication system 1000' in accordance with a comparative example of the sixth exemplary embodiment.

As illustrated in FIG. 13, the conventional optical communication system 1000' uses sub-carriers for the two services 3001 and 3002 based on order of location. FIG. 13 illustrates an example in which a sub-carrier is used starting from the left. Accordingly, in the conventional optical communication system 1000', if a service 3003 is further added from the optical node device D to the optical node device E, a sub-carrier group on a stage following the sub-carrier group to be used for the service 3002 to the optical node device F is used for the additional service 3003. In this case, an extra guard band GB is required for the additional service 3003.

On the other hand, as illustrated in FIG. 12, the optical communication system 1000C in accordance with the present exemplary embodiment uses a plurality of consecutive sub-carriers that are not adjacent to each other for each of the two services 3001 and 3002. FIG. 12 illustrates an example in which sub-carrier groups for the two services 3001 and 3002 are allocated from both ends of the consecutive sub-carriers. This makes it possible to allocate, for the additional service 3003, a sub-carrier group adjacent to the sub-carrier group to be used for the service 3001 toward the optical node device E if the service 3003 is further added from the optical node device D to the optical node device E; therefore, it is only necessary to add a single guard band GB for the services 3001 and 3003.

As described above, the optical communication system 1000C in accordance with the present exemplary embodiment can make the number of guard bands GB to be added smaller even though a demand for upgrading a communication throughput arises in transferring services to a plurality of optical node devices.

Although the configuration has been described in the present exemplary embodiment that each of the optical node devices D, E, and F includes two optical transmitters 100 described in the second exemplary embodiment, the optical node devices D, E, and F may include a plurality of optical transmitters each of which is one of the optical transmitters 100, 100B, and 100C described in the second exemplary embodiment, the modification example of the second exemplary embodiment, and the third exemplary embodiment.

A Seventh Exemplary Embodiment

Figure 14:
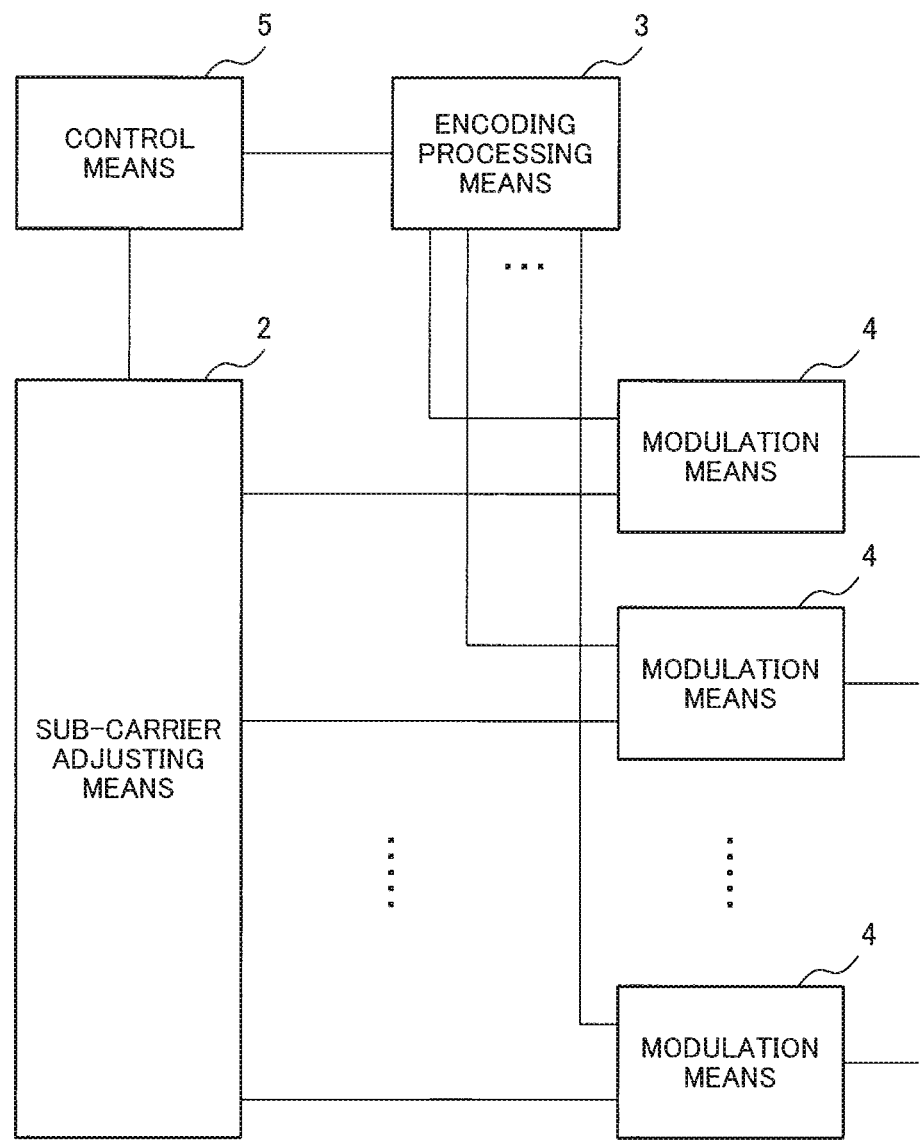
FIG. 14 is a block configuration diagram of an optical transmitter 1 in accordance with a seventh exemplary embodiment.

The seventh exemplary embodiment will be described. FIG. 14 is a block configuration diagram of an optical transmitter in accordance with the present exemplary embodiment. In FIG. 14, an optical transmitter 1 includes a sub-carrier adjusting means 2, an encoding processing means 3, a plurality of modulation means 4, and a control means 5.

The sub-carrier adjusting means 2 outputs a plurality of sub-carriers to the plurality of modulation means 4 through a predetermined output port according to a control signal inputted from the control means 5. The sub-carrier adjusting means 2 in accordance with the present exemplary embodiment variably controls the optical frequency bandwidth of a sub-carrier and then outputs the sub-carrier to a predetermined output port.

The encoding processing means 3 processes client data according to a control signal inputted from the control means 5 and maps the processed client data on a predetermined output lane. The encoding processing means 3 in accordance with the present exemplary embodiment determines the number of output lanes for a transfer frame and maps the client data based on the determined number of the output lanes, according to the control signal.

Each of the plurality of modulation means 4 is connected to an output port of the sub-carrier adjusting means 2 and to the output lane of the encoding processing means 3, modulates inputted sub-carriers by inputted client data, and outputs a modulated signal. Here, a plurality of modulated signals output from the plurality of modulation means 4 are aggregated for each route of a transmission destination, and the aggregated signals are output as a transmission signal from the optical transmitter 1 after a predetermined guard band is added based on a frequency bandwidth of the sub-carrier and the transmission destination.

The control means 5 generates the control signal based on transmission information and outputs the control signal to the sub-carrier adjusting means 2 and the encoding processing means 3. Here, the transmission information includes information on a transmission destination of a transmission signal (modulated signal) and transfer throughput information of a service to be transmitted. The control means 5 in accordance with the present exemplary embodiment generates a control signal to make the number of guard bands to be added to the transmission signal smaller.

The optical transmitter 1 configured as described above can accommodate a plurality of services and can make the number of guard bands of an optical frequency band to be added to a transmission signal to be transmitted from the optical transmitter 1 smaller.

The invention of the present application is not limited to the above-described exemplary embodiments and includes design changes without departing from the scope of the present invention.

INDUSTRIAL APPLICABILITY

The invention of the present application can be widely applied to an optical communication system in which a signal is transmitted and received accommodating a service in a plurality of sub-carriers.

This application is based upon and claims the benefit of priority from Japanese Patent Application No. 2014-056845, filed on Mar. 19, 2014 and Japanese Patent Application No. 2014-239102, filed on Nov. 26, 2014, the disclosure of which is incorporated herein in its entirety by reference.

REFERENCE SIGNS LIST

1 Optical transmitter
2 Sub-carrier adjusting means
3 Encoding processing means
4 Modulation means
5 Control means
10 Optical transmitter
20 Sub-carrier generating means
30 Sub-carrier adjusting means
40 First wavelength multiplexer/demultiplexer
50 Second wavelength multiplexer/demultiplexer
60 Allocating means
70 Modulation means
80 Encoding processing means
100, 100B, 100C Optical transmitter
110 Controller
200C Carrier
201, 202 Carrier
300C Sub-carrier generator
301, 302 Sub-carrier generator
401, 402 Variable band filter
501, 502 Wavelength multiplexer/demultiplexer
600 Matrix optical switch
701 to 720 Sub-carrier modulator
800 Signal processing unit
900B, 900C Optical multicast switch
1000, 1000B, 1000C Optical communication system
1100 Client-side interface
1200 Framer
1200B Cross-connect unit
1300 Optical node controller
1400 Line-side interface unit
1500 Optical multicast switch
1600 Network controller
2000, 2001 to 200N Optical node device

The invention claimed is:

1. An optical transmitter, comprising:
a controller configured to generate a control signal based on transmission information;
a sub-carrier adjuster configured to control an optical frequency bandwidth of sub-carriers variably according to the control signal, and output the sub-carriers to a plurality of output ports;
an encoder configured to map client data on a plurality of output lanes according to the control signal;
a plurality of modulators configured to modulate the sub-carriers inputted through the output ports by client data inputted through the output lanes and outputting modulated signals;
an outputter configured to aggregate a plurality of the modulated signals output based on the transmission information and outputting aggregated signals as a transmission signal after adding a guard band, wherein the controller generates the control signal so that number of pieces of the guard band to be added is decreasable; and
an allocator, including (i+k) output ports and (N+M) input ports each of which being connected to an output port of the sub-carrier adjuster, configured to allocate sub-carriers inputted through the input ports to the modulators through a corresponding port of the output ports according to the control signal,
wherein the sub-carrier adjuster includes a first sub-carrier adjuster configured to output sequentially the sub-carriers from N output ports and a second sub-carrier adjuster configured to output sequentially the sub-carriers from M output ports, according to the control signal,
the encoder maps client data on (i+k) output lanes according to the control signal, and
the outputter aggregates modulated signals generated by sub-carriers output from the first sub-carrier adjuster, and aggregates modulated signals generated by sub-carriers output from the second sub-carrier adjuster.

2. The optical transmitter according to claim 1, further comprising
a first sub-carrier generator and a second sub-carrier generator configured to generate sub-carriers whose wavelengths differing from each other and output the sub-carriers to each of the first sub-carrier adjuster and the second sub-carrier adjuster.

3. The optical transmitter according to claim 2,
wherein the sub-carrier adjuster is configured by a variable band filter and a cyclic arrayed waveguide grating, and
the outputter is an optical multicast switch configured to output a transmission signal to each of a plurality of routes.

4. The optical transmitter according to claim 2,
wherein the sub-carrier adjuster sequentially outputs the sub-carriers, and the controller generates the control signal for a control to make inconsecutive sub-carriers to be used for transmission signals with different transmission destinations.

5. The optical transmitter according to claim 1, further comprising
a sub-carrier generator configured to generate sub-carriers and distribute the sub-carriers among the first sub-carrier adjuster and the second sub-carrier adjuster,
wherein the outputter outputs modulated signals aggregated corresponding to the first sub-carrier adjuster and modulated signals aggregated corresponding to the second sub-carrier adjuster, to different transmission destinations.

6. The optical transmitter according to claim 5,
wherein the sub-carrier adjuster is configured by a variable band filter and a cyclic arrayed waveguide grating, and
the outputter is an optical multicast switch configured to output a transmission signal to each of a plurality of routes.

7. The optical transmitter according to claim 5,
wherein the sub-carrier adjuster sequentially outputs the sub-carriers, and
the controller generates the control signal for a control to make inconsecutive sub-carriers to be used for transmission signals with different transmission destinations.

8. The optical transmitter according to claim 1,
wherein the sub-carrier adjuster is configured by a variable band filter and a cyclic arrayed waveguide grating, and
the outputter is an optical multicast switch configured to output a transmission signal to each of a plurality of routes.

9. The optical transmitter according to claim 6,
wherein the sub-carrier adjuster sequentially outputs the sub-carriers, and
the controller generates the control signal for a control to make inconsecutive sub-carriers to be used for transmission signals with different transmission destinations.

10. The optical transmitter according to claim 1,
wherein the sub-carrier adjuster sequentially outputs the sub-carriers, and
the controller generates the control signal for a control to make inconsecutive sub-carriers to be used for transmission signals with different transmission destinations.

11. The optical transmitter according to claim 1,
wherein the sub-carrier adjuster is configured by a variable band filter and a cyclic arrayed waveguide grating, and
the outputter is an optical multicast switch configured to output a transmission signal to each of a plurality of routes.

12. The optical transmitter according to claim 1,
wherein the sub-carrier adjuster sequentially outputs the sub-carriers, and
the controller generates the control signal for a control to make inconsecutive sub-carriers to be used for transmission signals with different transmission destinations.

13. The optical transmitter according to claim 1,
wherein the sub-carrier adjuster sequentially outputs the sub-carriers, and
the controller generates the control signal for a control to make inconsecutive sub-carriers to be used for transmission signals with different transmission destinations.

14. An optical communication device, comprising
a first optical transmitter;
a second optical transmitter; and
a controller configured to control the first optical transmitter and the second optical transmitter so that number of pieces of guard bands to be added to transmission signals to be transmitted from the first optical transmitter and the second optical transmitter is smaller,
wherein each of the first optical transmitter and the second optical transmitter includes:
  a controller configured to generate a control signal based on transmission information,
  a sub-carrier adjuster configured to control an optical frequency bandwidth of sub-carriers variably according to the control signal, and output the sub-carriers to a plurality of output ports;
  an encoder configured to map client data on a plurality of output lanes according to the control signal;
  a plurality of modulators configured to modulate the sub-carriers inputted through the output ports by client data inputted through the output lanes and outputting modulated signals;
  an outputter configured to aggregate a plurality of the modulated signals output based on the transmission information and outputting aggregated signals as a transmission signal after adding a guard band, wherein the controller generates the control signal so that number of pieces of the guard band to be added is decreasable; and
  an allocator, including (i+k) output ports and (N+M) input ports each of which being connected to an output port of the sub-carrier adjuster, configured to allocate sub-carriers inputted through the input ports to the modulators through a corresponding port of the output ports according to the control signal,
wherein the sub-carrier adjuster of each of the first optical transmitter and the second optical transmitter includes a first sub-carrier adjuster configured to output sequentially the sub-carriers from N output ports and a second sub-carrier adjuster configured to output sequentially the sub-carriers from M output ports, according to the control signal,
the encoder maps of each of the first optical transmitter and the second optical transmitter client data on (i+k) output lanes according to the control signal, and
the outputter of each of the first optical transmitter and the second optical transmitter aggregates modulated signals generated by sub-carriers output from the first sub-carrier adjuster, and aggregates modulated signals generated by sub-carriers output from the second sub-carrier adjuster.

15. The optical communication device according to claim 14,
wherein the first optical transmitter transmits a transmission signal relating to an operational service, and
the second optical transmitter transmits a transmission signal relating to a service for failure with respect to the operational service.

16. An optical communication system, comprising
a plurality of the optical communication devices, according to claim 14, configured to transmit and receive the transmission signals mutually; and a controller configured to control each of the plurality of optical communication devices so that total number of pieces of guard bands to be added to transmission signals to be output from the plurality of optical communication devices is smaller.

17. An optical transmission method, comprising:
generating a control signal based on transmission information;
mapping, by an encoder, client data on a plurality of output lanes according to the control signal generated;
controlling, by a sub-carrier adjuster, an optical frequency bandwidth of sub-carriers variably according to the control signal generated, and outputting the sub-carriers to a plurality of output ports; and
outputting a plurality of modulated signals by a plurality of modulators modulating each of sub-carriers inputted through a corresponding output port by client data inputted through a corresponding output lane;
aggregating, by an outputter, the plurality of modulated signals output based on the transmission information;
outputting aggregated signals as a transmission signal after adding a guard band;
generating the control signal so that number of pieces of the guard band to be added is decreasable;
allocating, by an allocator including (i+k) output ports and (N+M) input ports each of which being connected to an output port of the sub-carrier adjuster, sub-carriers inputted through the input ports to the modulators through a corresponding port of the output ports according to the control signal,
wherein the sub-carrier adjuster includes a first sub-carrier adjuster configured to output sequentially the sub-carriers from N output ports and a second sub-carrier adjuster configured to output sequentially the sub-carriers from M output ports, according to the control signal,
the encoder maps client data on (i+k) output lanes according to the control signal, and
the outputter aggregates modulated signals generated by sub-carriers output from the first sub-carrier adjuster, and aggregates modulated signals generated by sub-carriers output from the second sub-carrier adjuster.

* * * * *